United States Patent [19]

Takenouchi et al.

[11] Patent Number: 4,925,757
[45] Date of Patent: May 15, 1990

[54] ELECTROPHOTOGRAPHIC PHOTORECEPTOR FOR NEGATIVE ELECTRIFICATION

[75] Inventors: Shigeki Takenouchi; Akira Hirano; Shiori Saito; Yoshihide Fujimaki, all of Hachioji, Japan

[73] Assignee: Konica Corporation, Tokyo, Japan

[21] Appl. No.: 228,287

[22] Filed: Aug. 4, 1988

[30] Foreign Application Priority Data

Aug. 12, 1987 [JP] Japan .................. 62-201124
Aug. 13, 1987 [JP] Japan .................. 62-202134

[51] Int. Cl.$^5$ .............................. G03G 5/07
[52] U.S. Cl. ........................ 430/31; 430/57; 430/70; 430/56
[58] Field of Search ............ 430/70, 56, 87, 31

[56] References Cited

U.S. PATENT DOCUMENTS

| | | | |
|---|---|---|---|
| 3,861,912 | 1/1975 | Ibrahim | 430/56 |
| 4,515,883 | 5/1985 | Sasaki | 430/72 X |
| 4,572,884 | 2/1986 | Sasaki | 430/72 |
| 4,709,096 | 11/1987 | Sasaki | 430/72 X |

*Primary Examiner*—J. David Welsh
*Attorney, Agent, or Firm*—Jordan B. Bierman

[57] ABSTRACT

An electrophotographic photoreceptor useful for negative electrification is disclosed. The photoreceptor comprises on an electroconductive substrate, a photo-sensitive layer containing a compound represented by general formula [A]:

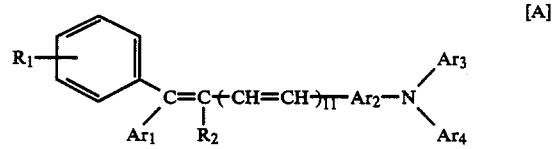

wherein, $R_1$ represents a hydrogen atom or a substituent; $R_2$ represents a hydrogen atom, a substituted or unsubstituted alkyl group, or a substituted or unsubstituted aryl group; $Ar_1$ represents a hydrogen atom, a substituted or unsubstituted phenyl group, a substituted or unsubstituted naphthyl group; $Ar_2$ represents a substituted or unsubstituted phenylene group or a substituted or unsubstituted naphthylene group; $Ar_3$ and $Ar_4$ independently represent a substituted or unsubstituted alkyl group, a substituted or unsubstituted phenyl group or a substituted or unsubstituted naphthyl group; and n represents an integer of 0 or 1; and a compound containing in its chemical structure a hindered phenolic structure unit.

17 Claims, 1 Drawing Sheet

ELECTROPHOTOGRAPHIC PHOTORECEPTOR FOR NEGATIVE ELECTRIFICATION

FIELD OF THE INVENTION

The present invention relates to an electrophotographic photoreceptor, more specifically, to an electrophotographic photoreceptor containing a compound which possesses a hindered phenol structural unit.

BACKGROUND OF THE INVENTION

With an electrophotographic copying apparatus according to the Carlson process, once the surface of a photoreceptor is electrified, an electrostatic latent image is formed by exposing, thereby the formed electrostatic latent image is developed by a toner, and then, the resultant positive image is transferred and fixed onto a paper sheet or the like. Additionally, the photoreceptor is subject to removal of remaining toner, electrical neutralizing and cleaning of the member surface, in order to allow prolonged repeated use.

Accordingly, the requirements for an electrophotographic photoreceptor include not only such electrophotographic properties as excellent electrification, excellent sensitivity and less dark decay, but physical properties in relation to repeated operations, such as a press life, wear-resistance and moisture-resistance, as well as satisfactory resistance to ozone generated when corona charge is applied, or to ultraviolet ray emitted during exposing (environmental resistance).

A conventional electrophotographic photoreceptor commonly used in the art is an inorganic photoreceptor having a photosensitive layer principally comprising a inorganic photoconductive material such as selenium, zinc oxide and cadmium sulfide.

Recently, the research and development of various organic photoconductive materials as materials for forming photosensitive layer in an electrophotographic photoreceptor is actively undertaken in the art.

For example, Japanese Patent Examined Publication No. 0496/1975 describes an organic photoreceptor having a photosensitive layer containing poly-N-vinylcarbazole and 2,4,7-trinitro-9-fluorenone. This photoreceptor, however, does not necessarily meet the requirements for sensitivity and press life. To solve such a disadvantage, a development effort has been focused on an organic photoreceptor with high sensitivity and longer press life, wherein a photosensitive layer comprises a different materials capable of generating an electrical charge and of transporting the generated charge, respectively. In forming such a "separated function" type electrophotographic photoreceptor, a specific material intended for respective function is selected from a wide range of materials and, accordingly, an electrophotographic photoreceptor having aimed properties is rather readily available.

Diverse types of materials effectively serving as a charge generating material for such a separated function type electrophotographic photoreceptor have been proposed. One example of an inorganic material serving this purpose is an amorphous selenium described in Japanese Patent Examined Publication No. 16198/1968. This material is used together with an organic charge transporting material.

Additionally, many types of electrophotographic photoreceptors comprising an organic dye or organic pigment as a charge generating material have been proposed. For example, those having photosensitive layers containing a bisazo compound are known in the art by Japanese Patent Publication Open to Public Inspection (hereinafter referred to as Japanese Patent O.P.I. Publication) Nos. 37543/1972, 22834/1980, 79632/1979, and 116040/1981.

In electrophotographic process, however, ozone or another activated substance generated upon electrification by corona charge will cause such problems as deterioration of electrification properties, sensitivity loss and increase of residual potential.

Especially, of electrification properties and sensitivity loss as well as increase of residual potential are significantly promoted during repeated use, since the time of exposure to ozone and the other activated substances accumulatively increases.

To improve above properties, an antioxidant is added as described in Japanese Patent O.P.I. Publication Nos. 130759/1981, 73744/1982, and 122444/1981. Despite an antioxidant added, there still remain dilemmatic problems unsolved: photoreceptor favorable in electrification properties tends to have lower initial sensitivity; photoreceptor preferable in initial sensitivty is rather less resistant to deterioration due to repeated use; photoreceptor less liable to deterioration due to repeated use is insufficient in initial sensitivity and electrification properties.

SUMMARY OF THE INVENTION

The object of the present invention is to provide an electrophotographic photoreceptor which has excellent environmental resistance properties, especially in ozone resistance, as well as repeatability, wherein the following disadvantages are remarkably improved; reduction of electrification capacity in repeated use, increase of dark decay, sensitivity loss and increase of residual potential.

The object of the invention concerned is attained by an electrophotographic photoreceptor for negative electrification, provided on an electroconductive substrate with a photosensitive layer containing a compound represented by the following general formula [A], wherein the photoreceptor contains a compound comprising a hindered phenol structural unit.

General formula [A]

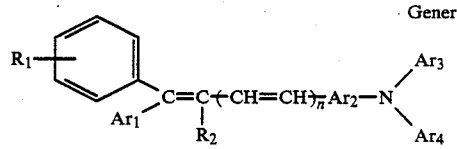

In this formula, $R_1$ represents a hydrogen atom or a substituent group. $R_2$ represents a hydrogen atom, substituted or unsubstituted alkyl group; or substituted or unsubstituted aryl group. $Ar_1$ represents a hydrogen atom, a substituted or unsubstituted phenyl group or a substituted or unsubstituted naphthyl group. $Ar_2$ represents a substituted or unsubstituted phenylene group or a substituted or unsubstituted naphthylene group. $Ar_3$ and $Ar_4$ respectively represent a substituted or unsubstituted alkyl group, a substituted or unsubstituted phenyl group or a substituted or unsubstituted naphthyl group. n represents 0 or 1.

Figure 1:
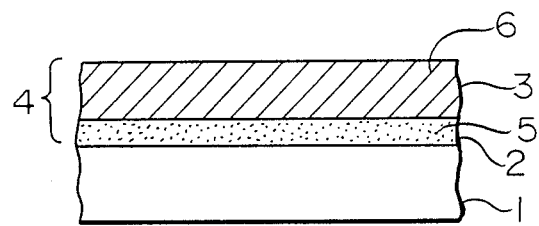
FIGS. 1, 2 and 3 respectively illustrate a cross sectional view of an electrophotographic photoreceptor embodying the present invention.

1 ... Substrate
2 ... Charge generation layer (CGL)
3 ... Charge transportation layer (CTL)
4 ... Photosensitive layer
5 ... Charge generation material (CGM)
6 ... Charge transportation material (CTM)

DETAILED DESCRIPTION OF THE INVENTION

The hindered phenol structural unit according to the invention concerned is a phenolic structural unit which is characterized by a bulky atomic group on the ortho position to a phenolic hydroxyl or alkoxy group.

A branched alkyl group is generally preferable as the bulky atomic group.

Though there is no established theory on the mechanism of its action, one possible reason is that steric hindrance induced from the bulky atomic group controls thermal vibration of phenolic hydroxy group or alkoxy group, and inhibits the effect of an external activated substance.

In the present invention, the preferred hindered phenol structural unit is represented by the following general formula [I].

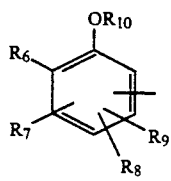

General formula [I]

In the above formula [I], $R_6$ represents a branched alkyl group. $R_7$, $R_8$ and $R_9$ respectively represent a hydrogen atom, hydroxy group, alkyl group or aryl group. At least two of $R_7$, $R_8$ and $R_9$ may be bonded together to form a ring. $R_{10}$ represents a hydrogen atom, alkyl group or alkylidene group.

The preferable $R_6$ is a tert- or sec-alkyl group having 3 to 40 carbon atoms.

The preferable group of $R_7$, $R_8$ or $R_9$ is an alkyl group having 1 to 40 carbon atoms; or an aryl group such as a phenyl group, naphthyl group and pyridyl group.

When $R_7$ and $R_8$ jointly form a ring, the preferred ring is a chroman ring.

The preferred alkyl or alkylidene group represented by $R_{10}$ is an alkyl or alkylidene group having 1 to 40 carbon atoms, and particularly preferred is an alkyl or alkylidene group having 1 to 18 carbon atoms.

The typical examples of the compound having the hindered phenol structural unit (hereinafter abbreviated to HP compound) used for the present invention are listed below. However, the scope of the compounds useful in embodying the invention is not limited only to these examples.

Example compounds having hindered phenol structural unit

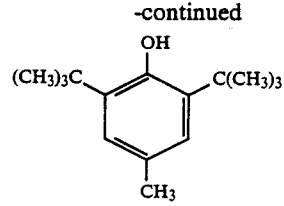

HP-1

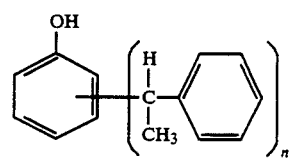

HP-2

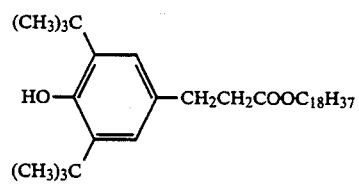

HP-3

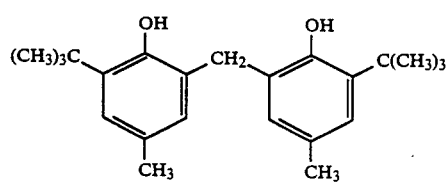

HP-4

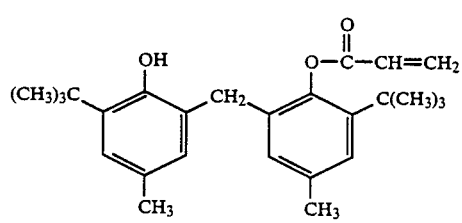

HP-5

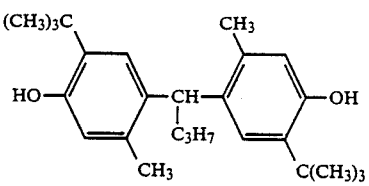

HP-6

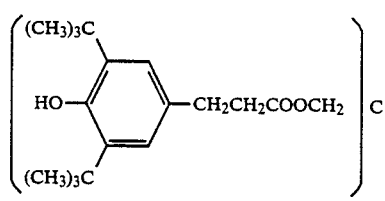

HP-7

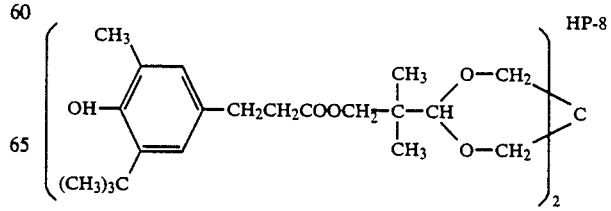

HP-8

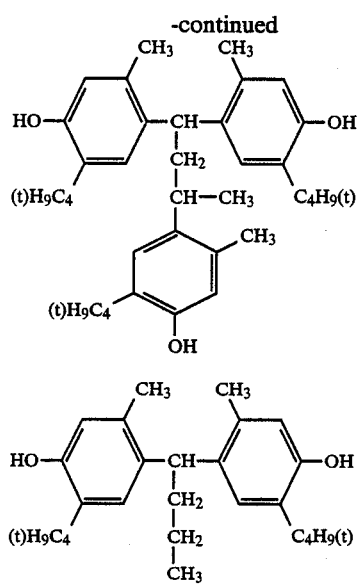

HP-9

HP-10

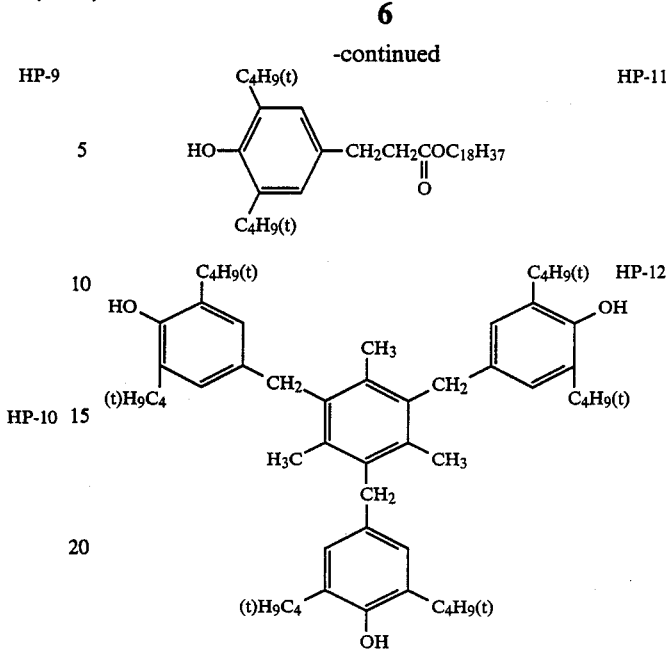

HP-11

HP-12

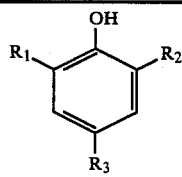

| Compound | $R_1$ | $R_2$ | $R_3$ |
|---|---|---|---|
| HP-13 | $t\text{-}C_4H_9$ | $t\text{-}C_4H_9$ | $C_4H_9$ |
| HP-14 | $t\text{-}C_4H_9$ | $t\text{-}C_4H_9$ | $t\text{-}C_4H_9$ |
| HP-15 | $t\text{-}C_4H_9$ | $t\text{-}C_4H_9$ | $sec\text{-}C_4H_9$ |
| HP-16 | $t\text{-}C_4H_9$ | $t\text{-}C_4H_9$ | $C_2H_5$ |
| HP-17 | $t\text{-}C_4H_9$ | $CH_3$ | $CH_3$ |
| HP-18 | $t\text{-}C_4H_9$ | $CH_3$ | $t\text{-}C_4H_9$ |
| HP-19 | $t\text{-}C_4H_9$ | $CH_3$ | $C_4H_9$ |
| HP-20 | $t\text{-}C_4H_9$ | $CH_3$ | $sec\text{-}C_4H_9$ |
| HP-21 | $t\text{-}C_4H_9$ | $CH_3$ | $C_2H_5$ |
| HP-22 | $t\text{-}C_4H_9$ | $C_2H_5$ | $C_4H_9$ |
| HP-23 | $t\text{-}C_4H_9$ | $C_2H_5$ | $t\text{-}C_4H_9$ |
| HP-24 | $t\text{-}C_4H_9$ | $C_2H_5$ | $sec\text{-}C_4H_9$ |
| HP-25 | $t\text{-}C_4H_9$ | $C_2H_5$ | $CH_3$ |
| HP-26 | $t\text{-}C_4H_9$ | $C_2H_5$ | $C_2H_5$ |
| HP-27 | $C_2H_5$ | $C_2H_5$ | $sec\text{-}C_4H_9$ |
| HP-28 | $C_2H_5$ | $C_2H_5$ | $t\text{-}C_4H_9$ |
| HP-29 | $i\text{-}C_4H_9$ | $i\text{-}C_4H_9$ | $CH_3$ |
| HP-30 | $sec\text{-}C_4H_9$ | $sec\text{-}C_4H_9$ | $C_3H_7$ |
| HP-31 | $sec\text{-}C_4H_9$ | $sec\text{-}C_4H_9$ | $sec\text{-}C_4H_9$ |

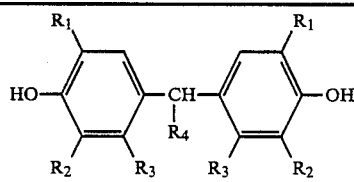

| Compound | $R_1$ | $R_2$ | $R_3$ | $R_4$ |
|---|---|---|---|---|
| HP-32 | $CH_3$ | H | H | H |
| HP-33 | $CH_3$ | $CH_3$ | H | H |
| HP-34 | $CH_3$ | $t\text{-}C_4H_9$ | H | H |
| HP-35 | $t\text{-}C_4H_9$ | $t\text{-}C_4H_9$ | H | H |
| HP-36 | $t\text{-}C_4H_9$ | H | H | $CH_3$ |
| HP-37 | $CH_3$ | H | H | $t\text{-}C_4H_9$ |
| HP-38 | H | $CH_3$ | $C_3H_7$ | $CH_3$ |
| HP-39 | $t\text{-}C_4H_9$ | H | $CH_3$ | H |
| HP-40 | $CH_3$ | H | $CH_3$ | $C_3H_7$ |
| HP-41 | $t\text{-}C_4H_9$ | H | $CH_3$ | $C_5H_{11}$ |
| HP-42 | $CH_3$ | $CH_3$ | H | $C_9H_{19}$ |

-continued

| | HP-43 | $C_{12}H_{25}$ | $CH_3$ | H | H |
|---|---|---|---|---|---|

$$R_1O-\underset{\underset{R_5\quad R_6}{}}{\overset{\overset{R_3\quad R_4}{}}{\bigcirc}}-OR_2$$

| Compound | $R_1$ | $R_2$ | $R_3 \sim R_6$ |
|---|---|---|---|
| HP-44 | $C_7H_{15}$ | $C_7H_{15}$ | $R_3$: $C_{12}H_{25}$(sec) $R_6$: $CH_3$ |
| HP-45 | $C_{10}H_{21}$ | $C_{10}H_{21}$ | $R_3$: $C_8H_{17}$(t) $R_6$: $CH_3$ |
| HP-46 | $C_{20}H_{41}$ | $C_{20}H_{41}$ | $R_3$: $C_4H_9$(t) $R_6$: $CH_3$ |
| HP-47 | $C_4H_9$ | $C_4H_9$ | $R_3$: $C_{12}H_{25}$(sec) $R_6$: $CH_3$ |
| HP-48 | $C_4H_9$ | $C_4H_9$ | $R_3$: $C_8H_{17}$(t) $R_6$: $CH_3$ |
| HP-49 | $C_4H_9$ | $C_4H_9$ | $R_3$: $C_4H_9$(t) $R_6$: $CH_3$ |
| HP-50 | $C_8H_{17}$ | $C_8H_{17}$ | $R_3$: $C_{18}H_{37}$(sec) $R_6$: $CH_3$ |
| HP-51 | $C_8H_{17}$ | $C_8H_{17}$ | $R_3$: $C_{18}H_{37}$(sec) $R_6$: $CH_3$ |
| HP-52 | $C_8H_{17}$ | $C_8H_{17}$ | $R_3$: $C_8H_{17}$(t) $R_6$: $CH_3$ |
| HP-53 | $C_8H_{17}$ | $C_8H_{17}$ | $R_3$: $C_4H_9$(t) $R_6$: $CH_3$ |
| HP-54 | $C_{12}H_{25}$ | $C_{12}H_{25}$ | $R_3$: $C_4H_9$(t) $R_6$: $CH_3$ |
| HP-55 | $C_{12}H_{25}$ | $C_{12}H_{25}$ | $R_3$: $C_8H_{17}$(t) $R_6$: $CH_3$ |
| HP-56 | $C_{12}H_{25}$ | $C_{12}H_{25}$ | $R_3$: $C_{12}H_{25}$(sec) $R_6$: $CH_3$ |
| HP-57 | $C_{16}H_{33}$ | $C_{16}H_{33}$ | $R_3$: $C_4H_9$(sec) $R_6$: $CH_3$ |
| HP-58 | $C_{16}H_{33}$ | $C_{16}H_{33}$ | $R_3$: $C_4H_9$(t) $R_6$: $CH_3$ |
| HP-59 | $C_{16}H_{33}$ | $C_{16}H_{33}$ | $R_3$: $C_{12}H_{25}$(sec) $R_6$: $CH_3$ |
| HP-60 | $C_8H_{17}$ | $C_8H_{17}$ | $R_3$: $CH_3$ $R_5$: $CH_3$ $R_6$: $CH_3$ |
| HP-61 | $C_{12}H_{25}$ | $C_{12}H_{25}$ | $R_3$: $CH_3$ $R_5$: $CH_3$ $R_6$: $CH_3$ |
| HP-62 | $C_{16}H_{33}$ | $C_{16}H_{33}$ | $R_3$: $CH_3$ $R_5$: $CH_3$ $R_6$: $CH_3$ |
| HP-63 | $CH_2CH{=}CH_2$ | $CH_2CH{=}CH_2$ | $R_3$: $C_8H_{17}$(t) $R_6$: $C_8H_{17}$(t) |
| HP-64 | $C_8H_{17}$ | $C_8H_{17}$ | $R_3$: $C_4H_9$(t) $R_6$: $C_4H_9$(t) |
| HP-65 | $C_8H_{17}$ | $C_8H_{17}$ | $R_3$: $CH_2{-}N\overbrace{\phantom{xx}}O$  $R_6$: $CH_2{-}N\overbrace{\phantom{xx}}O$ (morpholine) |
| HP-66 | $C_{18}H_{33}$ | $C_{18}H_{33}$ | $R_3$: $CH_2{-}N\overbrace{\phantom{xx}}O$  $R_6$: $CH_2{-}N\overbrace{\phantom{xx}}O$ (morpholine) |
| HP-67 | $C_{18}H_{37}$ | $C_{18}H_{37}$ | $R_3$: $C_{12}H_{25}$ $R_6$: $CH_3$ |
| HP-68 | $C_{16}H_{33}$ | $C_{16}H_{33}$ | $R_3$: $C_{12}H_{25}$ $R_6$: $C_{12}H_{25}$ |
| HP-69 | $C_{12}H_{25}$ | $C_{12}H_{25}$ | $R_3$: $C_{16}H_{33}$(sec) $R_6$: $C_{16}H_{33}$(sec) |
| HP-70 | $C_2H_5$ | $C_2H_5$ | $R_3$: $(CH_2)_{11}OCH_3$ $R_6$: $(CH_2)_{11}OCH_3$ |
| HP-71 | —C$_6$H$_4$—C$_4$H$_9$(t) | —C$_6$H$_4$—C$_4$H$_9$(t) | $R_3$: $C_{11}H_{23}$ $R_6$: $C_{11}H_{23}$ |
| HP-72 | $C_{18}H_{35}$ | $C_{18}H_{35}$ | $R_3$: $C_{12}H_{25}$(sec) $R_6$: $C_{12}H_{25}$(sec) |
| HP-73 | $CH_3$ | $(CH_2)_{10}Br$ | $R_3$: $OCH_3$ |
| HP-74 | cyclohexyl | cyclohexyl | $R_3$: $C_{16}H_{33}$ $R_6$: $C_{16}H_{33}$ |
| HP-75 | $C_8H_{17}$ | $C_8H_{17}$ | $R_3$: tetrahydropyran-2-yloxy $R_6$: tetrahydropyran-2-yloxy |

-continued

HP-76
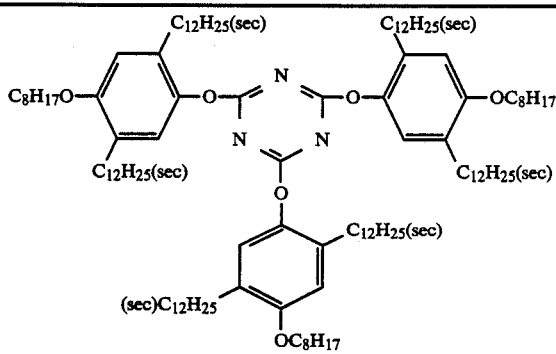

HP-77
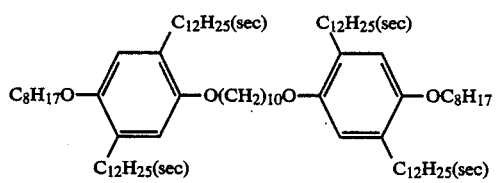

| | | | |
|---|---|---|---|
| HP-78 | $C_3H_7(i)$ | $C_3H_7(i)$ | $R_3$: $(CH_2)_{11}OCH_3$ |
| HP-79 | $C_{18}H_{37}$ | $C_{18}H_{37}$ | $R_3$: $CH_2$—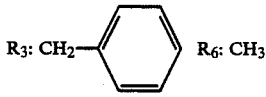  $R_6$: $CH_3$ |
| HP-80 | 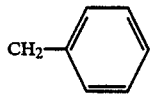 | 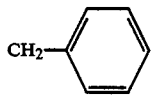 | $R_3$: $C_{16}H_{33}(sec)$ $R_6$: $C_{16}H_{33}(sec)$ |
| HP-81 | $C_{12}H_{25}$ | $C_{16}H_{33}$ | $R_4$: $CH_3$ |
| HP-82 | $C_{18}H_{37}$ | $C_{18}H_{37}$ | $R_4$: $CH_3$ |
| HP-83 | $C_4H_9$ | $C_4H_9$ | $R_3$: Cl $R_6$: Cl |
| HP-84 | $C_5H_{11}(sec)$ | $C_5H_{11}(sec)$ | $R_4$: $N(CH_2CH_2OH)_2$ |
| HP-85 | $C_3H_7(i)$ |  | $R_3$: $C_8H_{17}(t)$ $R_6$: $CH_3$ |
| HP-86 | $C_7H_{15}(sec)$ | $C_7H_{15}(sec)$ | $R_3$: $CH_2CO_2C_2H_5$ $R_6$: $CH_2CO_2C_2H_5$ |
| HP-87 | $C_8H_{17}$ | $C_8H_{17}$ | $R_3$: $COCH_3$ |
| HP-88 | $C_{16}H_{33}$ | $C_{16}H_{33}$ | $R_3$: $COC_{11}H_{23}$ |
| HP-89 | $C_{12}H_{25}(sec)$ | $C_{12}H_{25}(sec)$ | $R_3$: $CO_2C_2H_5$ |
| HP-90 | $C_{16}H_{33}$ | $C_{16}H_{33}$ | $R_3$: $OC_2H_5$ $R_6$: $OC_2H_5$ |
| HP-91 | $CH_2CO_2C_2H_5$ | $CH_2CO_2C_2H_5$ | $R_3$: $C_4H_9(t)$ $R_6$: $C_4H_9(t)$ |
| HP-92 | CHCO$_2$C$_2$H$_5$<br>\|<br>C$_{12}$H$_{25}$ | $C_3H_7$ | $R_3$: $C_4H_9(t)$ $R_6$: $CH_3$ |
| HP-93 | $C_2H_5$ | $CH_2CH_2$—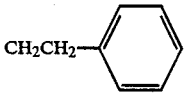 | $R_3$: $NHCOCH_3$ |
| HP-94 | $C_{12}H_{25}$ | $C_{12}H_{25}$ | $R_3$: $C_4H_9(t)$ $R_6$: $C_4H_9(t)$ |
| HP-95 | $C_8H_{17}$ | $C_8H_{17}$ | $R_3$: $C_8H_{17}(t)$ $R_6$: $C_8H_{17}(t)$ |
| HP-96 | $C_2H_5$ | $C_2H_5$ | $R_3$: $C_6H_{13}(t)$ $R_6$: $C_6H_{13}(t)$ |
| HP-97 | $CH_3$ | $CH_3$ | $R_3$: $C_4H_9(t)$ $R_6$: $C_4H_9(t)$ |
| HP-98 | $C_4H_9$ | $C_4H_9$ | $R_3$: $C_4H_9(t)$ $R_6$: $C_4H_9(t)$ |
| HP-99 | 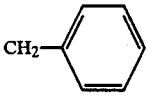 | 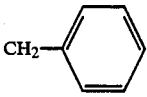 | $R_3$: $C_4H_9(t)$ $R_6$: $C_4H_9(t)$ |
| HP-100 | $C_{18}H_{37}$ | $C_{18}H_{37}$ | $R_3$: $C_4H_9(t)$ $R_6$: $C_4H_9(t)$ |
| HP-101 | $C_{16}H_{33}$ | $C_{16}H_{33}$ | $R_3$: $C_4H_9(t)$ $R_6$: $C_4H_9(t)$ |

| | | | |
|---|---|---|---|
| HP-102 | CH₂CH₂—⟨Ph⟩ | CH₂CH₂—⟨Ph⟩ | $R_3$: $C_4H_9(t)$  $R_6$: $C_4H_9(t)$ |
| HP-103 | $C_4H_9$ | $C_4H_9$ | $R_3$: $C_5H_{11}(t)$  $R_6$: $C_5H_{11}(t)$ |
| HP-104 | $C_2H_5$ | $C_2H_5$ | $R_3$: $C_5H_{11}(t)$  $R_6$: $C_5H_{11}(t)$ |
| HP-105 | $C_3H_7$ | $C_3H_7$ | $R_3$: $C_5H_{11}(t)$  $R_6$: $C_5H_{11}(t)$ |
| HP-106 | $CH_3$ | $CH_3$ | $R_3$: $C_5H_{11}(t)$  $R_6$: $C_5H_{11}(t)$ |
| HP-107 | CH₂—⟨Ph⟩ | CH₂—⟨Ph⟩ | $R_3$: $C_5H_{11}(t)$  $R_6$: $C_5H_{11}(t)$ |
| HP-108 | $CH_3$ | $CH_3$ | $R_3$: $C_6H_{13}(t)$  $R_6$: $C_6H_{13}(t)$ |
| HP-109 | $C_3H_7$ | $C_3H_7$ | $R_3$: $C_6H_{13}(t)$  $R_6$: $C_6H_{13}(t)$ |
| HP-110 | $C_4H_9$ | $C_4H_9$ | $R_3$: $C_6H_{13}(t)$  $R_6$: $C_6H_{13}(t)$ |
| HP-111 | CH₂—⟨Ph⟩ | CH₂—⟨Ph⟩ | $R_3$: $C_6H_{13}(t)$  $R_6$: $C_6H_{13}(t)$ |
| HP-112 | $CH_3$ | $CH_3$ | $R_3$: $C_8H_{17}(t)$  $R_6$: $C_8H_{17}(t)$ |
| HP-113 | $C_2H_5$ | $C_2H_5$ | $R_3$: $C_8H_{17}(t)$  $R_6$: $C_8H_{17}(t)$ |
| HP-114 | $C_3H_7$ | $C_3H_7$ | $R_3$: $C_8H_{17}(t)$  $R_6$: $C_8H_{17}(t)$ |
| HP-115 | $C_4H_9$ | $C_4H_9$ | $R_3$: $C_8H_{17}(t)$  $R_6$: $C_8H_{17}(t)$ |
| HP-116 | CH₂—⟨Ph⟩ | CH₂—⟨Ph⟩ | $R_3$: $C_8H_{17}(t)$  $R_6$: $C_8H_{17}(t)$ |
| HP-117 | $CH_3$ | $CH_3$ | $R_3$: $C_{12}H_{25}(t)$  $R_6$: $C_{12}H_{25}(t)$ |
| HP-118 | $C_2H_5$ | $C_2H_5$ | $R_3$: $C_{12}H_{25}(t)$  $R_6$: $C_{12}H_{25}(t)$ |
| HP-119 | $C_3H_7$ | $C_3H_7$ | $R_3$: $C_{12}H_{25}(t)$  $R_6$: $C_{12}H_{25}(t)$ |
| HP-120 | $C_4H_9$ | $C_4H_9$ | $R_3$: $C_{12}H_{25}(t)$  $R_6$: $C_{12}H_{25}(t)$ |
| HP-121 | CH₂—⟨Ph⟩ | CH₂—⟨Ph⟩ | $R_3$: $C_{12}H_{25}(t)$  $R_6$: $C_{12}H_{25}(t)$ |

The HP compound according to the invention can be synthesized through various methods, and some of the example compounds are commercially available.

According to a preferred embodiment of the invention, a photoconductive material in a photosensitive layer comprises a charge generation material (usually called CGM) and a charge transportation material (usually called CTM).

Figure 2:
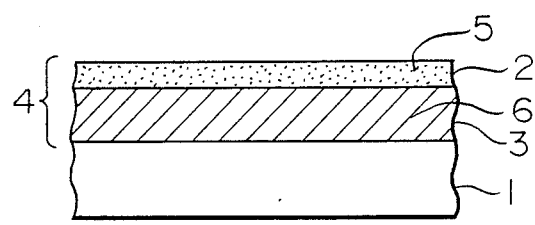
Figure 3:
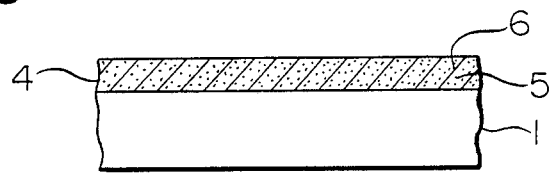

The photoreceptors of the invention are constituted, for example, as follows: in FIG. 1, on a substrate 1 (a electroconductive substrate or sheet provided thereon with an electroconductive layer) is provided a laminated photosensitive layer 4 comprising not only a lower layer as a charge generation layer 2 (may be hereinafter called CGL) which contains CGM 5 and, if necessary, a binder resin, but also an upper layer as a charge transportation layer 3 (may be hereinafter called CTL) which contains CTM 6 and, if necessary, a binder resin; the photoreceptor of the invention in FIG. 2 comprises a substrate 1 provided thereon with a laminated photosensitive layer 4 comprising a lower layer of CTL 3 and an upper layer of CGL 2; the photoreceptor of the invention in FIG. 3 comprises a substrate 1 provided thereon with a single photosensitive layer 4 containing both CGM 5 and CTM 6 and if necessary, a binder resin.

Another example is as follows; CGL may contain both CGM and CTM, wherein on the photosensitive layer may be disposed a protective layer (OCL), and an intermediate layer may be disposed between substrate and photosensitive layers.

The HP compound of the invention may be incorporated into any of layers that constitute a photoreceptor, i.e. CGL, CTL, intermediate layer single photosensitive layer and OCL. The compound may be incorporated into a plurality of the above layers. In the case of a multi-layer photoreceptor, the HP compound of the invention should be added to an outer side layer (more distant from the substrate). The HP compound is added to the photoreceptor according to the following methods: the HP compound of the invention is dissolved or dispersed in a coating solution which is used for forming layers such as CGL and CTL; or, when forming CGL and CTL by vacuum deposition, the compound of the invention is deposited together with CGM and CTM.

An amount of a HP compound added according to a invention varies by layer constitution of a photoreceptor and type of CTM. When added to CGL on a positive electrification type photoreceptor having CTL as a lower layer on a substrate, provided thereon with a CGL as an upper layer, the amount is 0.05 to 10 parts by weight, preferably 0.5 to 5 parts per 100 parts CGM; and in the case of a negative electrification type photoreceptor having CGL and CTL sequentially on a substrate, the amount is 0 to 1 part by weight, preferably 0 to 0.5 part per 100 parts CGM.

When HP compound is added to CTL on either positive or negative electrification type photoreceptor, the amount of HP compound is 0.02 to 30 parts by weight, preferably 0.1 to 10 parts per 100 parts CGM.

When added to a intermediate layer such as a subbing layer or to a protective layer, the amount is 0.01 to 200 parts by weight per 100 parts of binder resin.

Generally, any of inorganic pigments and organic dyes can be used as CGM suitable for the invention as far as they are capable of generating free charge when absorbing visible light. The examples of such inorganic pigments include amorphous selenium, trigonal selenium, selenium-arsenic alloy, selenium-tellurium alloy, cadmium sulfide, cadmium selenide, cadmium sulfur selenide, mercury sulfide, lead oxide and lead sulfide. The examples of useful organic pigments are as follows:

(1) Azo pigments such as a monoazo pigment, polyazo pigment, metal-complex azo pigment, pyrazolone azo pigment, stilbene azo pigment and thiazole azo pigment;

(2) Perylene pigments such as a perylene acid anhydride and perylene acid imide;

(3) Anthraquinone pigments and polycyclic quinone pigments such as anthraquinone derivative, anthoanthrone derivatives, dibenzopyrenequinone derivatives, pyranthrone derivatives, violanthrone derivatives, and isoviolanthrone derivatives;

(4) Indigoid pigments such as indigo derivatives, and thioindigo derivatives;

(5) Phthalocyanine pigments such as a metal phthalocyanine pigment and non-metal phthalocyanine pigment;

(6) Carbonium pigments such as a diphenylmethane pigment, triphenylmethane pigment, xanthene pigment and acridine pigment;

(7) Quinoneimine pigments such as an azine pigment, oxazine pigment and thiazine pigment;

(8) Methine pigments such as a cyanine pigment and azomethine pigment;

(9) Quinoline pigments;

(10) Nitro pigments;

(11) Nitroso pigments;

(12) Benzoquinone and naphthoquinone pigments

(13) Naphthalimide pigments; and

(14) Perinone pigments such as benzimidazole derivative

The examples of CGM preferably used for the invention are listed below.

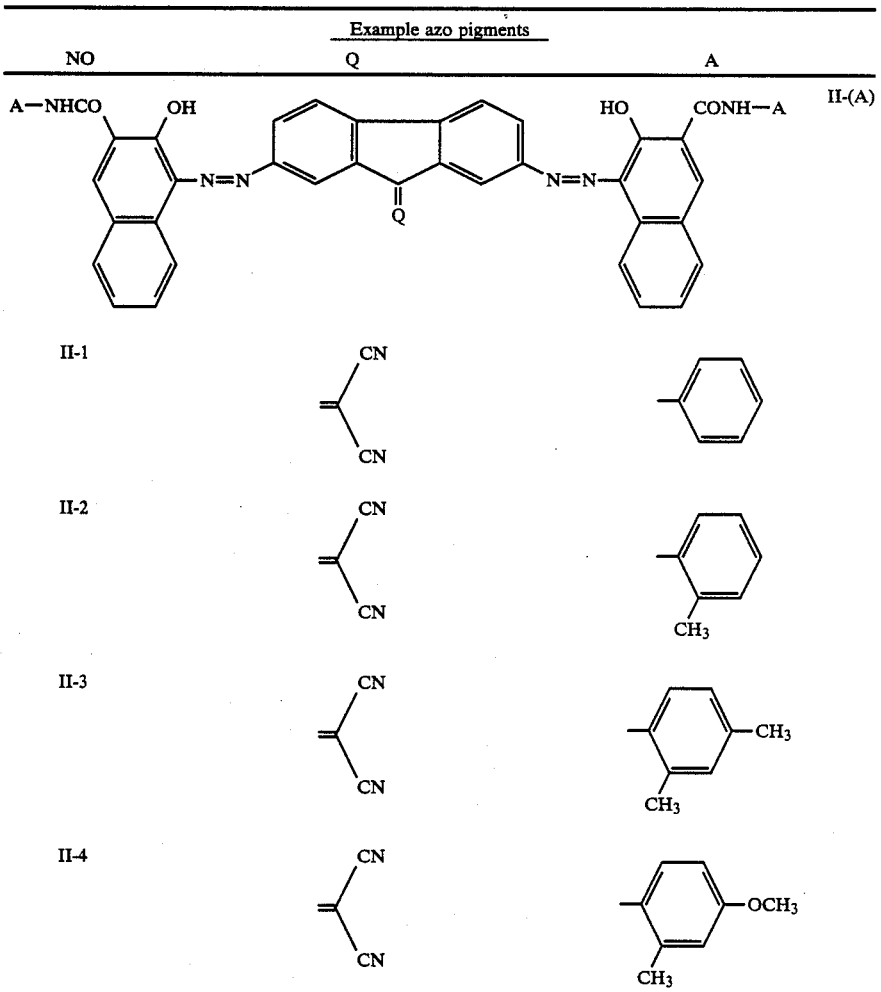

-continued

| NO | Example azo pigments Q | A |
|---|---|---|
| II-5 | =C(CN)₂ | naphthyl |
| II-6 | =C(CN)₂ | 2-chlorophenyl |
| II-7 | =C(CN)₂ | 4-bromophenyl |
| II-8 | =O | 2-bromophenyl |
| II-9 | =O | 4-methoxyphenyl |
| II-10 | =O | 2-chlorophenyl |
| II-11 | =CH(C₂H₅) | 3-nitrophenyl |
| II-12 | =CH(C₃H₇) | 4-N(CH₃)₂-phenyl |
| II-13 | =CH-cyclohexyl | 4-methoxy-3-methylphenyl |
| II-14 | =CH-phenyl | 2-methylphenyl |

-continued

| NO | Example azo pigments Q | A |
|---|---|---|
| II-15 | =CH–C₆H₅ | 4-OCH₃, 2-CH₃-C₆H₃ |
| II-16 | =CH–(2-thienyl) | 4-Cl-C₆H₄ |
| II-17 | =CH–(4-Cl-C₆H₄) | 2-C₂H₅-C₆H₄ |
| II-18 | 1-ethyl-pyridin-2(1H)-ylidene | C₆H₅ |
| II-19 | 1-methyl-pyridin-4(1H)-ylidene | 3,4-(CH₃)₂-C₆H₃ |
| II-20 | 5,6-dichloro-1,3-dimethyl-benzimidazol-2(3H)-ylidene | 4-NO₂-C₆H₄ |
| II-21 | 3,5-dimethyl-benzothiazol-2(3H)-ylidene | C₆H₅ |
| II-22 | 3-methyl-benzothiazol-2(3H)-ylidene | 4-CH₃-C₆H₄ |
| II-23 | 3-methyl-benzothiazol-2(3H)-ylidene | 4-OCH₃, 3-CH₃-C₆H₃ |

-continued

| NO | Example azo pigments Q | A |
|---|---|---|
| II-24 | benzothiazole with S, N-CH₃, =CH— | 2,5-disubstituted phenyl with C₂H₅ |
| II-25 | benzoxazole with O, N-CH₃, =CH— | phenyl with OCH₃ and CH₃ |
| II-26 | benzoxazole with O, N-CH₃, =CH— | phenyl with OCH₃ |
| II-27 | naphtho[2,3-d]oxazole with N-CH₃, =CH— | phenyl with NO₂ |
| II-28 | naphtho[2,3-d]thiazole with N-C₂H₆, =CH— | phenyl with CN |
| II-29 | 2-pyridyl-CH= | phenyl with CONH₂ |
| II-30 | benzoselenazole with Se, N-CH₃, =CH— | phenyl |
| II-31 | =C(CN)₂ | phenyl |

II-(B)

Structure showing A—NHCO and CONH—A groups linked via azo bridges (N=N) to a central fluorenone (Q) core, with naphthalene units bearing OH and NH-phenyl substituents.

-continued
| NO | Example azo pigments Q | A |
|---|---|---|
| II-32 | 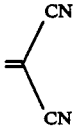 | 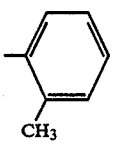 |
| II-33 | 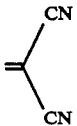 | 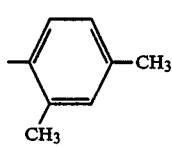 |
| II-34 | 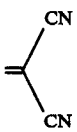 | 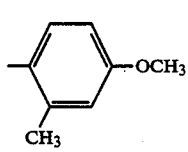 |
| II-35 | 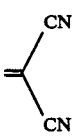 | 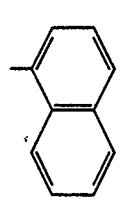 |
| II-36 | 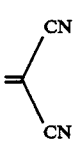 | 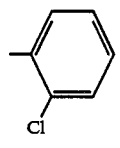 |
| II-37 | 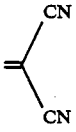 | 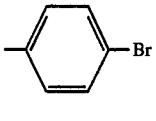 |
| II-38 | =O |  |
| II-39 | =O |  |
| II-40 | =O |  |
| II-41 | 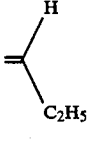 | 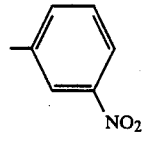 |

-continued
| NO | Example azo pigments Q | A |
|---|---|---|
| II-42 | 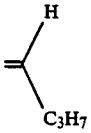 | 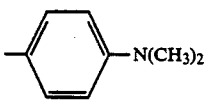 |
| II-43 | 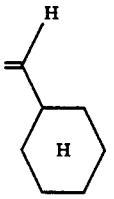 | 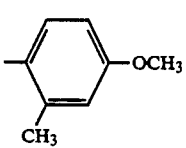 |
| II-44 | 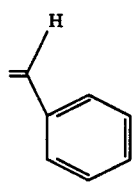 | 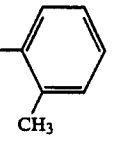 |
| II-45 | 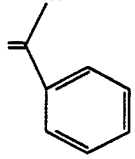 | 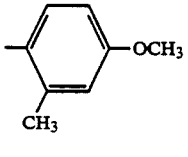 |
| II-46 | 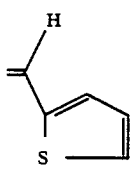 | 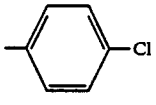 |
| II-47 | 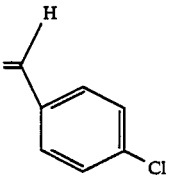 | 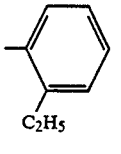 |
| II-48 | 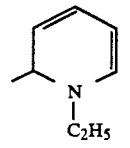 |  |
| II-49 | 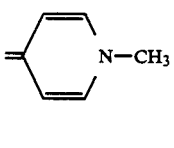 | 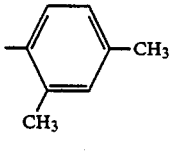 |
| II-50 | 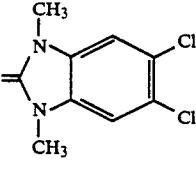 | 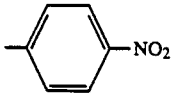 |

-continued

| NO | Example azo pigments Q | A |
|---|---|---|
| II-51 | 5-methyl-3-methyl-benzothiazol-2-ylidene | phenyl |
| II-52 | 3-methyl-benzothiazol-2-ylidene | 4-methylphenyl |
| II-53 | 3-methyl-benzothiazol-2-ylidene | 3-methyl-4-methoxyphenyl |
| II-54 | 3-methyl-benzothiazol-2-ylidene | 2-ethylphenyl |
| II-55 | 3-methyl-benzoxazol-2-ylidene | 3-methyl-4-methoxyphenyl |
| II-56 | 3-methyl-benzoxazol-2-ylidene | 3-methoxyphenyl |
| II-57 | 3-methyl-naphthoxazol-2-ylidene | 3-nitrophenyl |
| II-58 | 3-ethyl-naphthothiazol-2-ylidene | 4-cyanophenyl |
| II-59 | pyridylmethylene | 4-carbamoylphenyl |
| II-60 | 3-methyl-benzoselenazol-2-ylidene | phenyl |

Others
X-type non-metal phthalocyanine
τ-type non-metal phthalocyanine
Chloroaluminum phthalocyanine
Titanyl phthalocyanine
Vanadyl phthalocyanine
ε-type copper phthalocyanine
Chloroindium phthalocyanine
II-(C)
II-61
II-62
II-63
II-64
II-65
II-66
II-67
II-68
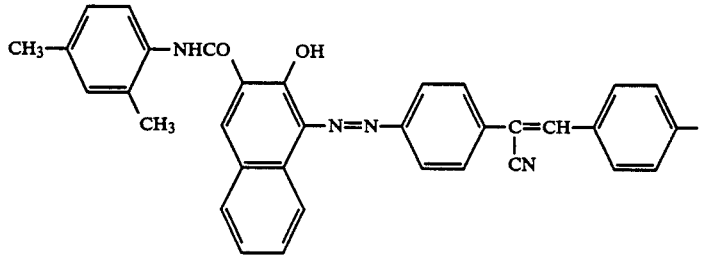
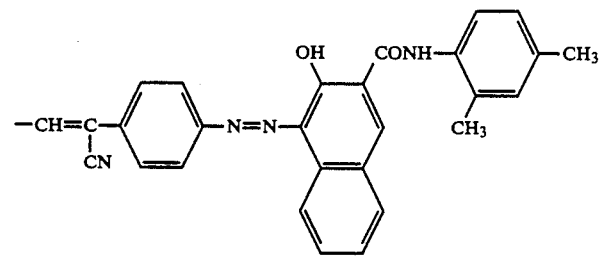
II-69
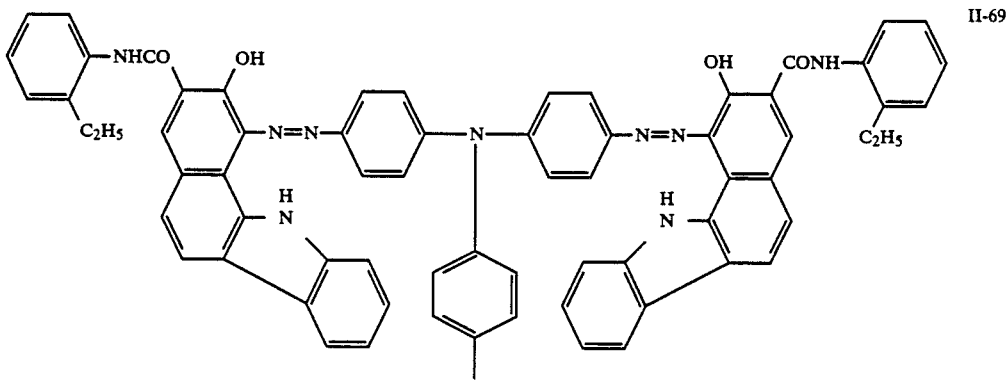
II-70
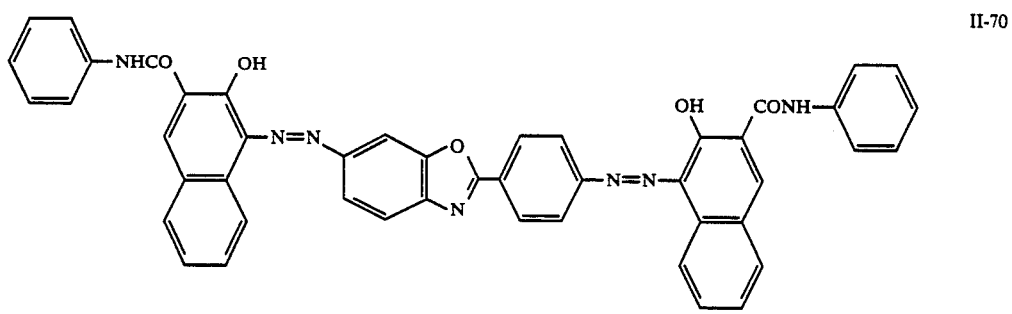
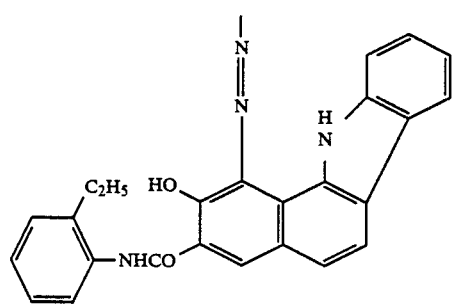

-continued
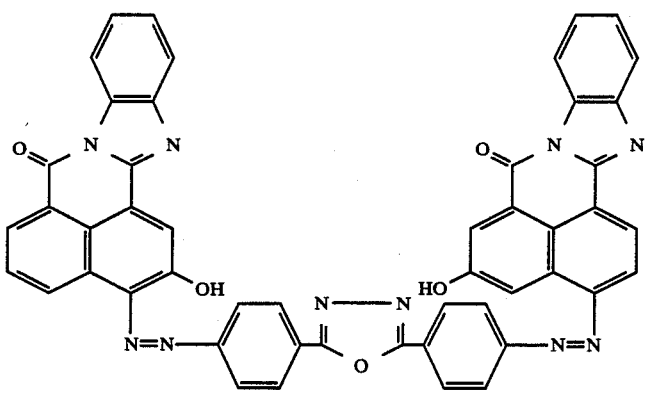
II-71
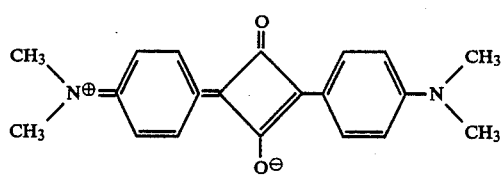
II-72
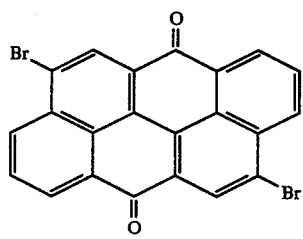
II-73
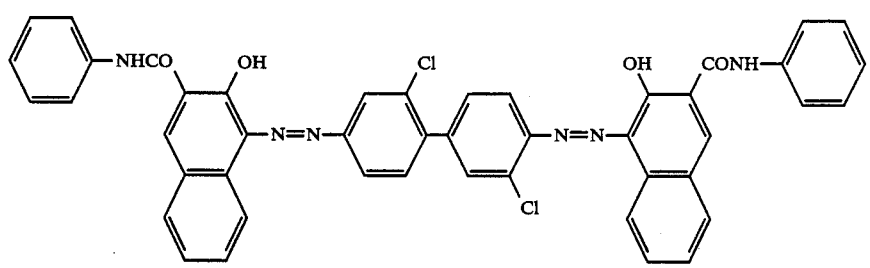
II-74
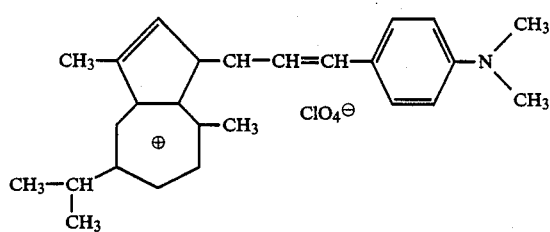
II-75
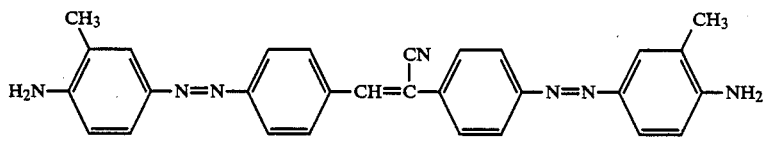
II-76

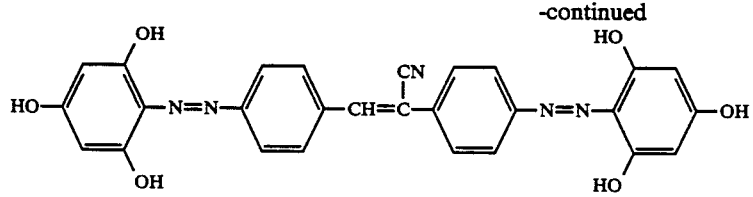

II-77

Besides those mentioned above, the CGM compounds useful for the invention are those described in Japanese Patent O.P.I. Publication No. 172045/1985.

CTMs used for the invention are the compounds represented by general formula [A].

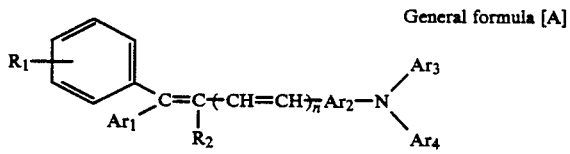

General formula [A]

In this formula, $R_1$ represents a hydrogen atom or a substituent group. $R_2$ represents a hydrogen atom, a substituted or unsubstituted alkyl group or a substituted or unsubstituted aryl group. $Ar_1$ represents a hydrogen atom, a substituted or unsubstituted phenyl group or a substituted or unsubstituted naphthyl group. $Ar_2$ represents a substituted or unsubstituted phenylene group or a substituted or unsubstituted naphthylene group. $Ar_3$ and $Ar_4$ represent, respectively, a substituted or unsubstituted alkyl group, a substituted or unsubstituted phenyl group or a substituted or unsubstituted naphthyl group. n represents 0 or 1.

The examples of the substituent group represented by $R_1$ include an alkyl group (e.g. methyl group, propyl group, butyl group and octyl group); alkoxy group (e.g. methoxy group, propoxy group and butoxy group); aryloxy group (e.g. phenoxy group); and halogen atom (e.g. chlorine atom). The examples of the alkyl group represented by $R_2$ include a methyl group and ethyl group, and those of the aryl group include a phenyl group and naphthyl group.

When each group represented by $R_1$, $R_2$ and $Ar_1$ through $Ar_4$ has a substituent group, the examples of the substituent group include an alkyl group, aryl group, alkoxy group and halogen atom.

The typical examples of CTM of the invention are hereunder listed. However, the scope of CTM useful in embodying the invention is not limited only to these examples.

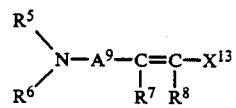

| Compound No. | —$R^5$ | —$R^6$ | —$R^7$ | —$R^8$ | —$A^9$— | —$X^{13}$ |
|---|---|---|---|---|---|---|
| III-1 | phenyl | phenyl | —H | | phenylene | phenylene | phenyl |
| III-2 | 2-methylphenyl | phenyl | —H | | phenylene | phenylene | 2-methylphenyl |
| III-3 | 3-methoxyphenyl | phenyl | —H | | phenylene | phenylene | 3-methoxyphenyl |
| III-4 | —CH$_3$ | —CH$_3$ | —H | —H | phenylene | phenylene |
| III-5 | —C$_2$H$_5$ | —C$_2$H$_5$ | —H | —H | phenylene | phenylene |

-continued

| | | | | | |
|---|---|---|---|---|---|
| III-6 | —C₂H₅ | —C₂H₅ | —H —H | ⌬— | —⌬—CH₃ |
| III-7 | —C₂H₅ | —C₂H₅ | —H —H | ⌬— | —⌬—OCH₃ |
| III-8 | —CH₂—⌬ | —CH₂—⌬ | —H —H | ⌬— | —⌬ |
| III-9 | —CH₂—⌬ | —CH₂—⌬ | —H | ⌬— | —⌬—CH₃ |
| III-10 | —CH₂—⌬ | —CH₂—⌬ | —H | ⌬— | —⌬—OCH₃ |
| III-11 | —CH₂—⌬ | —CH₂—⌬ | —H —H | —⌬(OCH₃) | —⌬—OCH₃ |
| III-12 | —C₂H₅ | —CH₂—⌬ | —H —H | ⌬— | —⌬—OCH₃ |
| III-13 | —⌬ | —⌬ | —H —H | ⌬— | —⌬(OCH₃)(OCH₃) |
| III-14 | —⌬ | —⌬ | —H —H | ⌬— | —⌬—CH₃ |
| III-15 | —⌬ | —⌬ | —H —H | ⌬— | —⌬—OCH₃ |
| III-16 | —⌬ | —⌬ | —H —H | ⌬— | —⌬—N(C₂H₅)₂ |
| III-17 | —⌬ | —⌬ | —H —H | ⌬— | —⌬—N(⌬)(⌬) |

-continued
| | | | | | |
|---|---|---|---|---|---|
| III-18 | 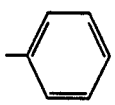 | 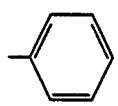 | —H —H | 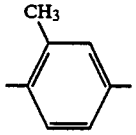 | 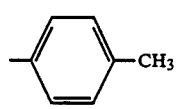 |
| III-19 | 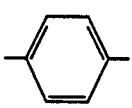 | 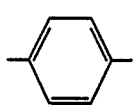 | —H —H | 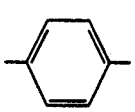 | 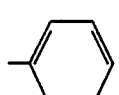 |
| III-20 | 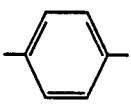 | 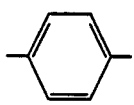 | —H —H | 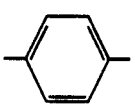 | 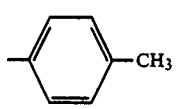 |
| III-21 | 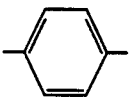 | 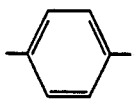 | —H —H | 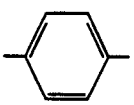 | 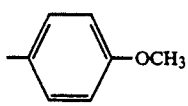 |
| III-22 | 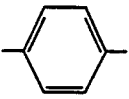 | 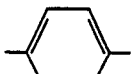 | —H —H | 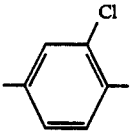 | 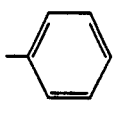 |
| III-23 | 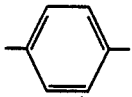 |  | —H —H |  | 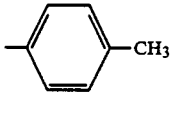 |
| III-24 | 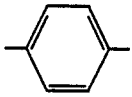 | 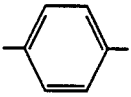 | —H —H |  | 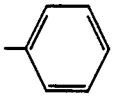 |
| III-25 | 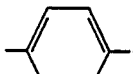 | 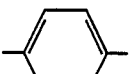 | —H —H |  | 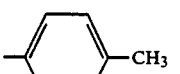 |
| III-26 | 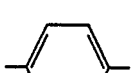 | 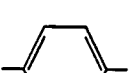 | —H —H |  |  |
| III-27 | 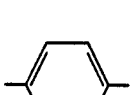 | 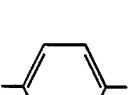 | —H —H | 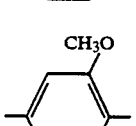 | 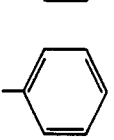 |
| III-28 | —$C_2H_5$ | —$C_2H_5$ | —H —H | 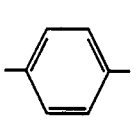 | 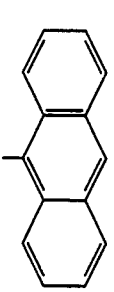 |

-continued
| | | | | |
|---|---|---|---|---|
| III-29 | 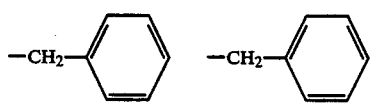 | —H —H | 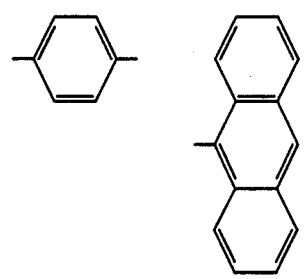 | |
| III-30 | 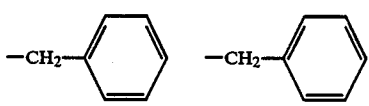 | —H —H | 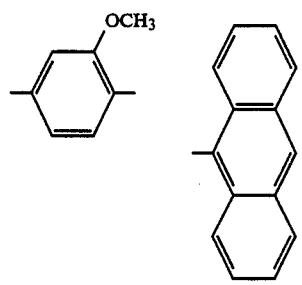 | |
| III-31 |  | —H —H | 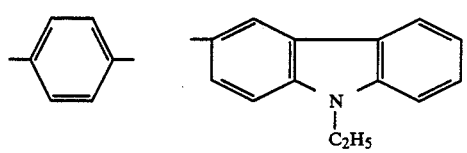 | |
| III-32 | 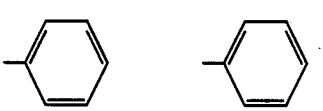 | —H —H | 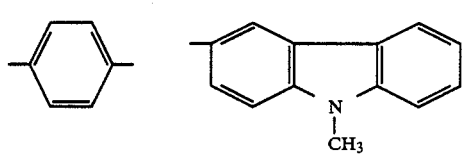 | |
| III-33 | 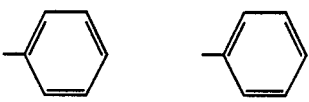 | —H —H | 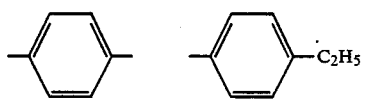 | |
| III-34 |  | —H —H | 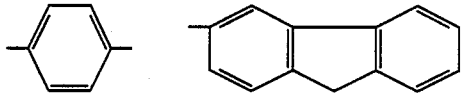 | |
| III-35 | 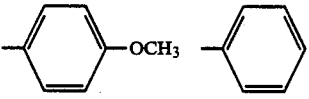 | —H —H | 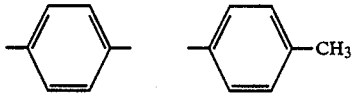 | |
| III-36 | 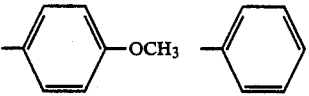 | —H —H | 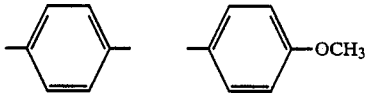 | |
| III-37 | 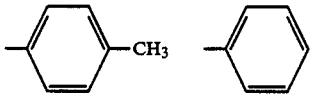 | —H —H | 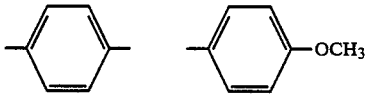 | |
| III-38 | 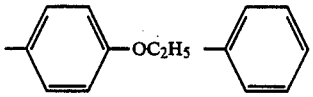 | —H —H | 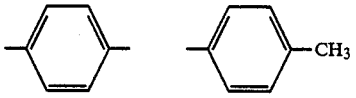 | |

-continued

| | Ar¹ | Ar² | R¹ | R² | Ar³ | Ar⁴ |
|---|---|---|---|---|---|---|
| III-39 | 4-CH₃O-C₆H₄- | C₆H₅- | —H | —H | C₆H₄- | 4-C₂H₅-C₆H₄- |
| III-40 | 4-CH₃O-C₆H₄- | C₆H₅- | —H | —H | C₆H₄- | 4-C₃H₇-C₆H₄- |
| III-41 | 4-CH₃O-C₆H₄- | C₆H₅- | —H | —H | C₆H₄- | 4-C₃H₇(iso)-C₆H₄- |
| III-42 | 4-CH₃O-C₆H₄- | C₆H₅- | —H | —H | C₆H₄- | 4-C₈H₁₇-C₆H₄- |
| III-43 | 4-CH₃O-C₆H₄- | C₆H₅- | —H | —H | C₆H₄- | C₆H₅- |
| III-44 | 4-CH₃O-C₆H₄- | C₆H₅- | —H | —H | C₆H₄- | 4-Cl-C₆H₄- |
| III-45 | 4-CH₃O-C₆H₄- | C₆H₅- | —H | —H | C₆H₄- | 3,4-(OCH₂O)-C₆H₃- |
| III-46 | 4-CH₃O-C₆H₄- | C₆H₅- | —H | —H | C₆H₄- | 3,5-Cl₂-C₆H₃- |
| III-47 | 4-CH₃O-C₆H₄- | C₆H₅- | —H | —H | C₆H₄- | 2,5-(CH₃)₂-C₆H₃- |
| III-48 | 4-CH₃O-C₆H₄- | C₆H₅- | —H | —H | C₆H₄- | 3-Cl-4-OCH₃-C₆H₃- |
| III-49 | 4-CH₃O-C₆H₄- | C₆H₅- | —H | —H | C₆H₄- | 2-COCH₃-5-OC₂H₅-C₆H₃- |

4,925,757

-continued

| | 41 | | | 42 | |
|---|---|---|---|---|---|
| III-50 | 4-MeO-C6H4- | C6H5- | -H | -H | C6H4- | 3,4,5-(MeO)3-C6H2- |
| III-51 | 4-MeO-C6H4- | C6H5- | -H | -H | C6H4- | 3-CN-C6H4- |
| III-52 | 4-MeO-C6H4- | C6H5- | -H | -H | C6H4- | 2,4,5-(CH3)3-C6H2- |
| III-53 | 4-MeO-C6H4- | C6H5- | -H | -H | C6H4- | 4-(CH2=CHCH2O)-C6H4- |
| III-54 | 4-CH3-C6H4- | C6H5- | -H | -H | C6H4- | 4-CH3-C6H4- |
| III-55 | 4-CH3-C6H4- | C6H5- | -H | -H | C6H4- | 4-C2H5-C6H4- |
| III-56 | 4-CH3-C6H4- | C6H5- | -H | -H | C6H4- | 4-OCH3-C6H4- |
| III-57 | 4-CH3-C6H4- | C6H5- | -H | -H | C6H4- | 4-OC2H5-C6H4- |
| III-58 | 4-CH3-C6H4- | C6H5- | -H | -H | C6H4- | 4-(C6H5CH2O)-C6H4- |
| III-59 | 4-CH3-C6H4- | C6H5- | -H | -H | C6H4- | 4-iso-C3H7-C6H4- |
| III-60 | 4-CH3-C6H4- | C6H5- | -H | -H | C6H4- | 4-OC4H9-C6H4- |
| III-61 | 4-CH3-C6H4- | C6H5- | -H | -H | C6H4- | 4-Cl-C6H4- |

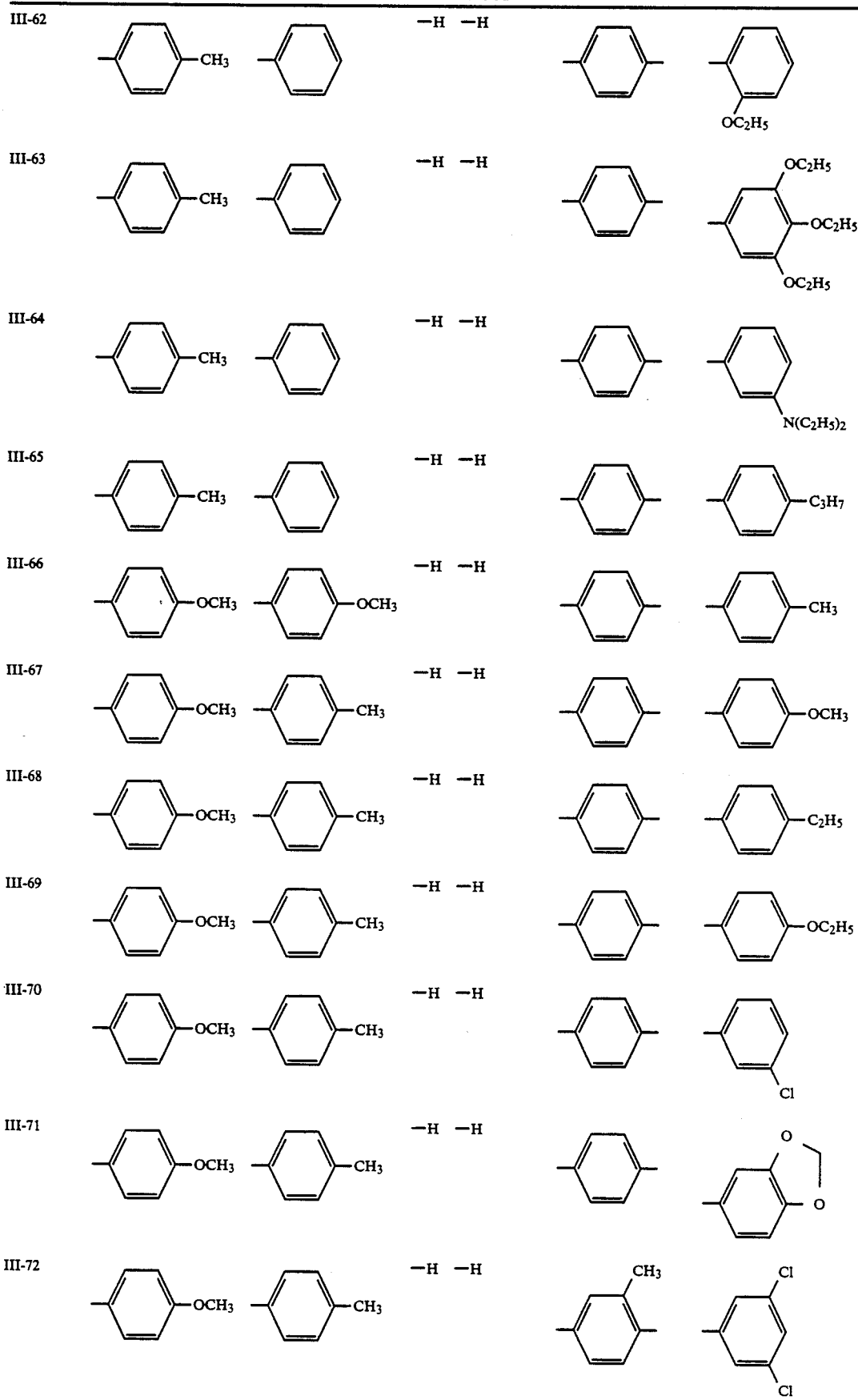

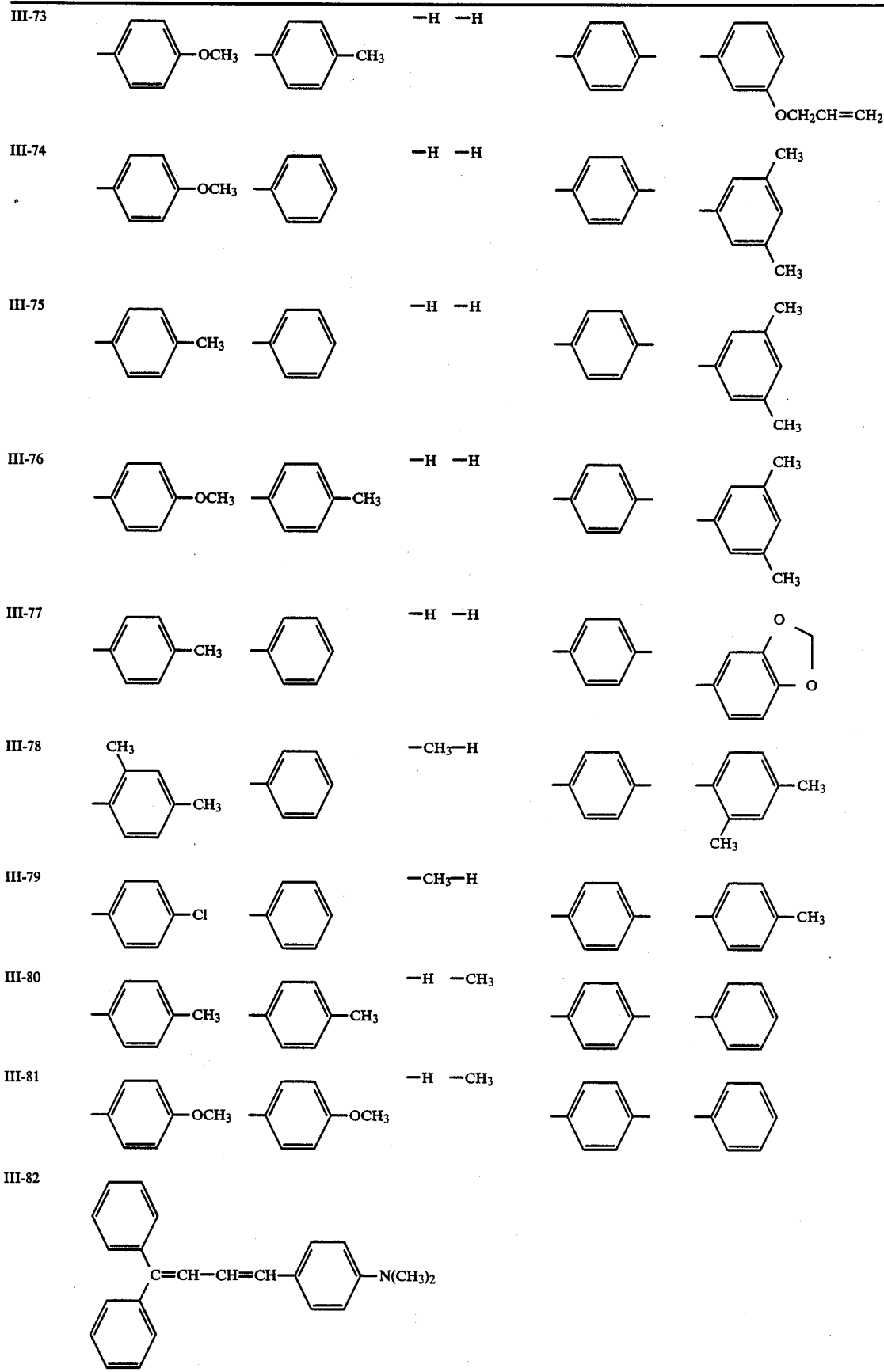

III-83

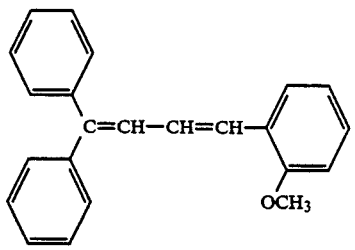

III-84

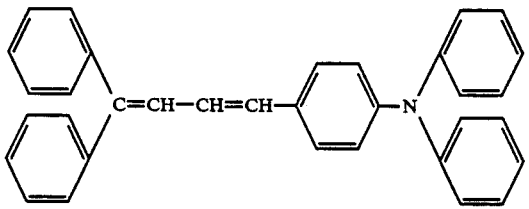

The CTM compounds mentioned above are readily synthesized in accordance with the method described in Japanese Patent O.P.I. Publication No. 198425/1983.

The photoreceptor of the invention may additionally contain, in a photosensitive layer containing a photoconductive compound, a compound having a hindered amine structural unit.

The hindered amine structural unit is characterized by a bulky atomic group adjacent to an amino nitrogen, wherein both aromatic and aliphatic amines are included. The aliphatic amines particularly exhibit the remarkable effects to meet the object of the present invention.

In the present invention, the hindered amine structural unit is preferably represented by the general formula [Ia],

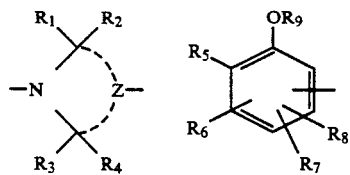

In the above formula, $R_1$, $R_2$, $R_3$ and $R_4$ represent a hydrogen atom, alkyl group or aryl group.

Z represents an atomic group which is necessary for constituting a nitrogen-containing alicyclic ring. Additionally, either one of the $R_1$ and $R_2$ groups or $R_3$ and $R_4$ groups may be incorporated into Z to form double bonding.

$R_1$, $R_2$, $R_3$ and $R_4$ are preferably alkyl groups having 1 to 40 carbon atoms. Such alkyl groups may have such substituent groups as an aryl group, alkoxy group, acid group, amide group or halogen atom.

Z represents an atomic group necessary for constituting a nitrogen-containing alicyclic ring, and is preferably an atomic group capable of constituting a five-membered or six-membered ring. The preferable ring structures are rings of piperidine, piperazine, morpholine, pyrrolidine, imidazolidine, oxazolidine, thiazolidine, selenazolidine, pyrroline, imidazoline, isoindoline, tetrahydroisoquinoline, tertahydropridine, dihydropyridine, dihydroisoquinoline, oxazoline, thiazoline, selenazoline and pyrrole, and most preferably piperidine, piperazine, and pyrrolidine.

The preferable $R_5$ is a tert- or sec-alkyl group having 3 to 40 carbon atoms.

The preferable group of $R_6$, $R_7$ or $R_8$ are an alkyl group having 1 to 40 carbon atoms or an aryl group such as a phenyl group, naphthyl group and pyridyl group.

When $R_6$ and $R_7$ jointly form a ring, the preferred ring is a chroman ring.

The preferred alkyl or alkylidene group represented by $R_9$ is an alkyl or alkylidene group having 1 to 40 carbon atoms, and the particularly preferred is an alkyl or alkylidene group having 1 to 18 carbon atoms.

The typical examples of the compound having the hindered amine structural unit (hereinafter abbreviated to HA compound) used for the present invention are listed below. However, the scope of the compounds useful in embodying the invention is not limited only to these examples.

Example compounds having hindered amine structural unit

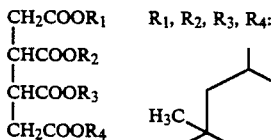  $R_1$, $R_2$, $R_3$, $R_4$:

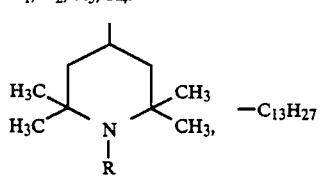

HA-1

-continued
—H  HA-2
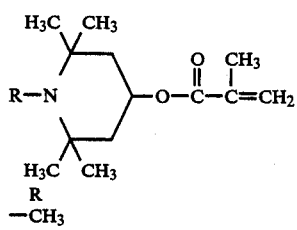
R  
—CH₃  HA-5
—H  HA-6
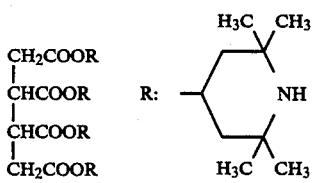 HA-7
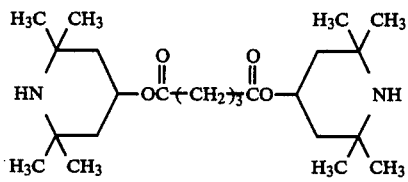 HA-8
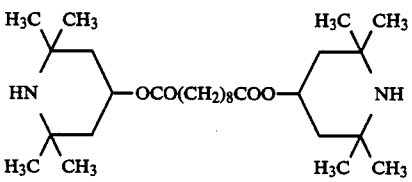 HA-9
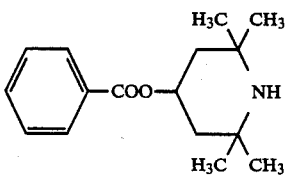 HA-10
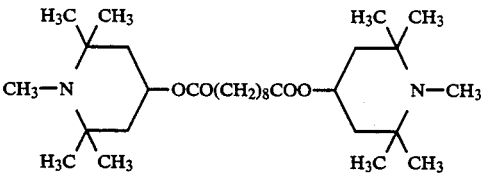 HA-11
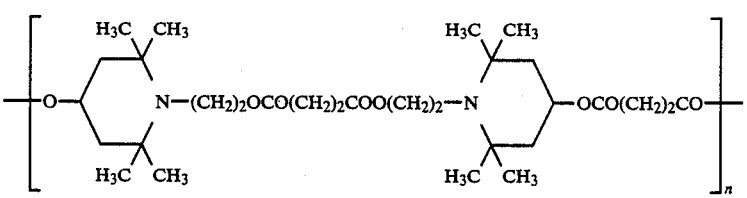 HA-12
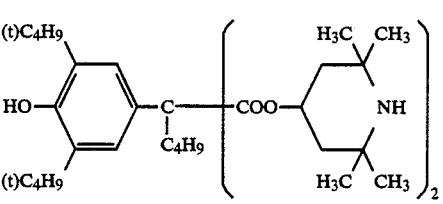 HA-13

-continued
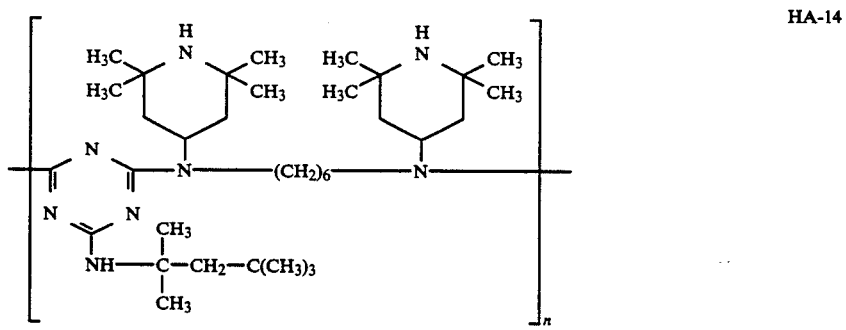 HA-14
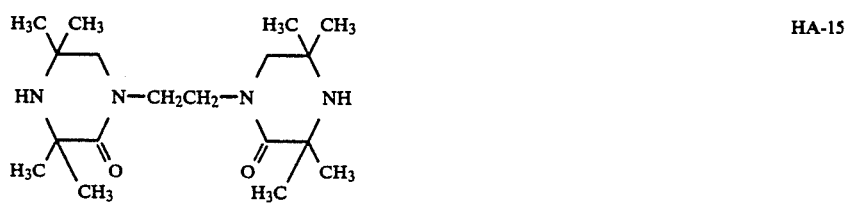 HA-15
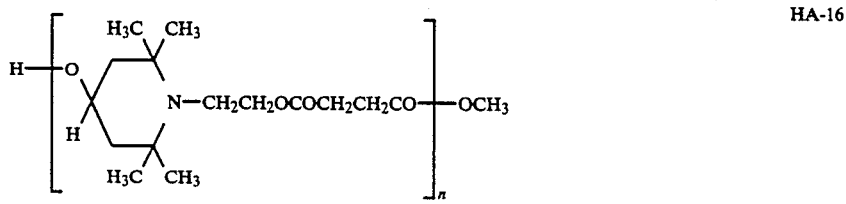 HA-16
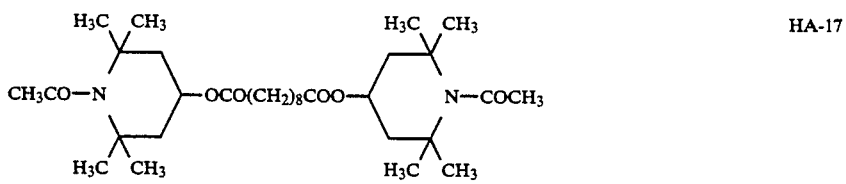 HA-17
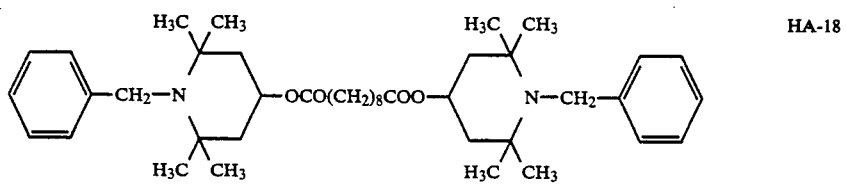 HA-18
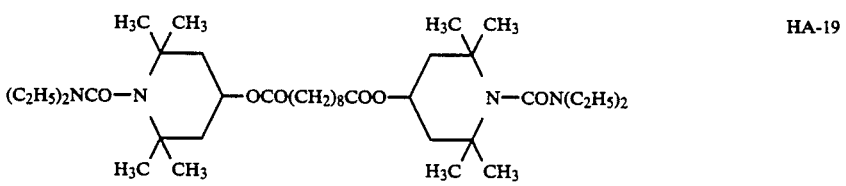 HA-19

-continued
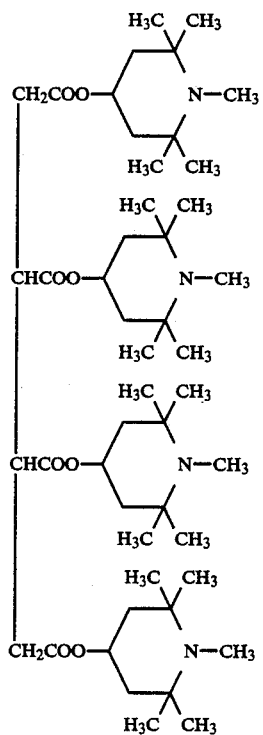
HA-20
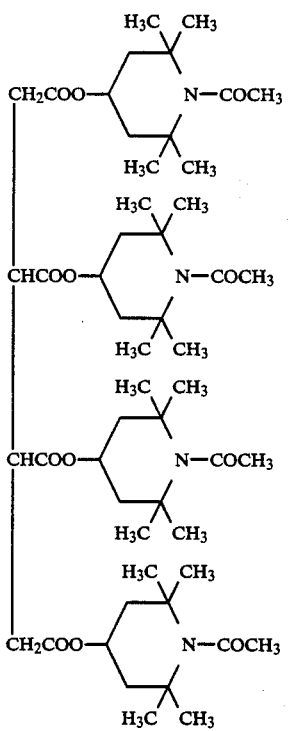
HA-21

HA-22
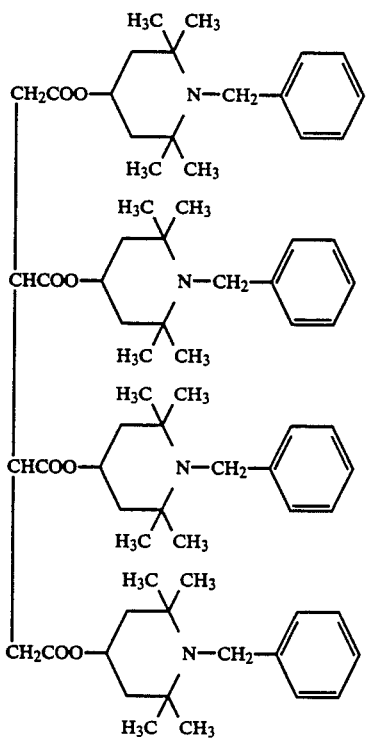
HA-23
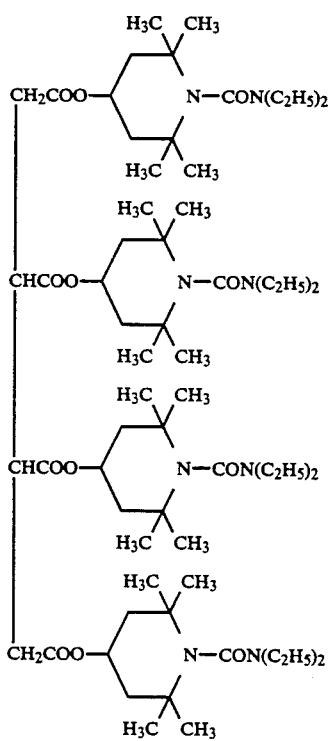
HA-24
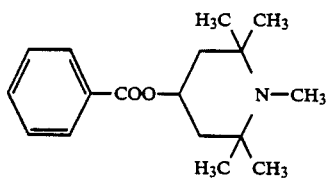

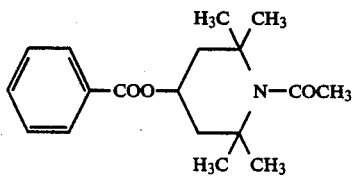

HA-25

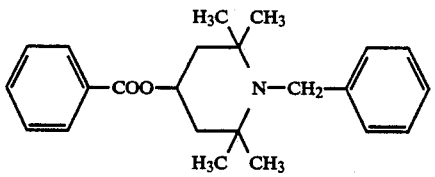

HA-26

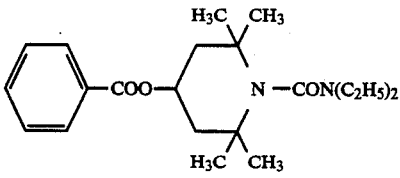

HA-27

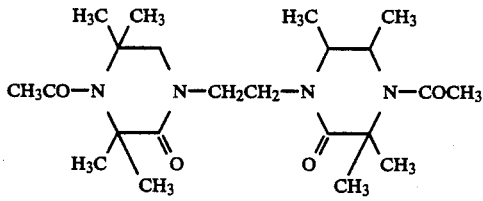

HA-28

The HA compounds of the invention can be synthesized with various processes, and some of the above-mentioned example compounds are commercially available.

According to a preferred embodiment of the invention, a photoconductive material in a photosensitive layer comprises a charge generation material (usually called CGM) and a charge transportation material (usually called CTM).

The photoreceptors of the invention are constituted, for example, as follows: in FIG. 1, on a substrate 1 (an electroconductive substrate or a sheet provided thereon with an electroconductive layer) is incorporated a laminated photosensitive layer 4 comprising a lower layer as a charge generation layer 2 (may be hereinafter called CGL) which contains CGM 5 and when necessary, a binder resin, and an upper layer as a charge transportation layer 3 (may be hereinafter called CTL) which contains CTM 6 and when necessary, a binder resin; the photoreceptor of the invention in FIG. 2 comprises a substrate 1 provided thereon with a laminated photosensitive layer 4 comprising a lower layer as CTL 3 and an upper layer as CGL 2; the photoreceptor of the invention in FIG. 3 comprises a substrate 1 provided thereon with a single photosensitive layer 4 containing both CGM 5 and CTM 6, and if necessary a binder resin.

Another example is as follows; CGL may contain both CGM and CTM, wherein on a photosensitive layer may be provided a protective layer (OCL), and an intermediate layer may be disposed between the substrate and photosensitive layers.

The HA compounds may be incorporated into any of layers that constitute a photoreceptor, i.e. CGL, CTL, intermediate layer, single photosensitive layer and OCL, or into a plurality of the above layers. In the case of a multi-layer photoreceptor, the HA compound should be added to an outer side layer (more distant from the substrate). The HA compounds are added to the photoreceptor according to the following methods; the HA and HP compounds of the invention are dissolved or dispersed in a coating solution which is used for forming a layer such as CGL and CTL; or, when forming CGL, CTL by vacuum deposition, the compounds of the invention are deposited together with CGM and CTM.

An amount of a HA compound added according to the invention varies by layer constitution of a photoreceptor and type of CTM. When the HA compound is added to CGL on a positive electrification type photoreceptor having CTL as a lower layer on a substrate, provided thereon with a CGL as an upper layer, the amount of a HP compound is 0.05 to 10 parts by weight, preferably 0.5 to 5 parts per 100 parts CGM, and the amount of the HA compound is 0.01 to 5 parts, preferably, 0.1 to 2 parts per 100 parts CGM; the ratio of the HP and HA compounds combinedly used is 1:1 to 300:1, preferably 2:1 to 150:1. In the case of a negative electrification type photoreceptor having CGL and CTL sequentially disposed on a substrate, the amount of the HP compound added to CGL is 0 to 1 part by weight, preferably 0 to 0.5 parts per 100 parts CGM, and the amount of the HA compound is 0 to 0.5 parts, preferably 0 to 0.1 part per 100 parts CGM; the ratio of the HP and HA compounds combinedly used is 1:1 to 300:1, preferably 2:1 to 150:1.

When the HA compound is added to CTL on either positive or negative electrification type photoreceptor, the amount of the HP compound is 0.02 to 30 parts by weight, particularly preferably 0.1 to 10 parts per 100 parts CGM. Similarly, the amount of the HA compound is 0.01 to 10 parts, particularly preferably 0.05 to 5 parts per 100 parts CTM.

The ratio of the HP and HA compounds combinedly used and HA is preferably 1:1 to 300:1, in particular 2:1 to 100:1.

When the HA compound is added to an intermediate layer such as a subbing layer or to a protective layer, the total amount of the HP and HA compounds is 0.01 to 200 parts by weight 100 parts of binder resin.

As mentioned previously, the photosensitive layers on a photoreceptor of the invention are categorized into a multi-layer constitution and a single layer constitution. Furthermore, in order to improve sensitivity and to reduce residual potential and fatigue caused in repeated use, one or two of electron accepting materials may be incorporated into any of surface layers such as CTL, CGL, single photosensitive layer or OCL, or further into more layers.

The examples of electron accepting materials applicable to the photoreceptor of the invention include succinic acid anhydride, maleic acid anhydride, dibromo maleic acid anhydride, phthalic acid anhydride, tetrachlorophthalic acid anhydride, tetrabromophthalic acid anhydride, 3-nitrophthalic acid anhydride, 4-nitrophthalic acid anhydride, pyromellitic acid anhydride, mellitic acid anhydride, tetracyanoethylene, tetracyanoquinodimethane, o-dinitrobenzene, m-dinitrobenzene, 1,3,5-trinitrobenzene, para-nitrobenzonitrile, picryl chloride, quinonechlorimide, chloranyl, bromanyl, 2-methylnaphthoquinone, di-chlorodicyanoparabenzoquinone, anthraquinone, dinitroanthraquinone, trinitrofluorenone, 9-fluorenilidene[dicyanomethylenemalonodinitrile], picric acid, o-nitrosuccinic acid, p-nitrosuccinic acid, 3,5-dinitrosuccinic acid, pentafluorosuccninic acid, 5-nitrosalicylic acid, 3,5-dinitrosalicylic acid and phthalic acid.

Additionally, silicon oil may be used as a surface modifying agent, and an ammonium compound may be contained as a durability improving agent.

The examples of binder resin applicable to a photosensitive layer according to the invention are as follows: addition polymerization resins, polyaddition resins and condensation polymerization resins, such as polyethylene, polypropylene, acrylic resin, methacrylic resin, vinyl chloride resin, vinyl acetate resin, epoxy resin, polyurethane resin, phenol resin, polyhydroxystyrene resin, polyester resin, alkyd resin, polycarbonate resin, silicon resin and melamine resin; and insulative copolymer resins containing not less than two of recurring structural units in the above resins such as vinyl chloride-vinyl acetate copolymeric resin and vinyl chloride-vinyl acetate-maleic acid anhydride copolymeric resin; and polymeric organic semiconductors such as poly-N-vinylcarbazole.

The foregoing intermediate layer serves as an adhesive layer or a barrier layer, and contains, in addition to the above binder resins, any of polyvinyl alcohol, ethylcellulose, carboxymethylcellulose, vinyl chloride-vinyl acetate copolymer, vinyl chloride-vinyl acetate-maleic acid anhydride copolymer, casein, N-alkoxymethyl nylon and starch.

The examples of a electroconductive substrate whereon the above photosensitive layer is incorporated are as follows, plate, drum or foil of aluminum or nickel; aluminum or nickel; plastic film vacuum-deposited thereon with aluminum, the oxide or indium oxide; paper, plastic film or plastic drum each coated with electroconductive materials.

CGL is formed by a method of vacuum-depositing CGM on a substrate or by a method where CGM is independently or together with a binder resin, dissolved or dispersed in a solvent, and the resultant dispersion is dried after coating on the substrate.

A ball mill, homogenizer, sand mill, ultrasonic disperser, atriter or the like is used for dispersing CGM.

The examples of a solvent useful for forming CGL include N,N-dimethyl formalmide, benzene, toluene, xylene, monochlorobenzene, 1,2-dichloroethane, dichloromethane, 1,1,2-trichloroethane, tetrahydrofuran, methylethylketone, ethyl acetate and butyl acetate.

The preferred amount of CGM in CGL is not less than 20 parts by weight per 100 parts binder resin, particularly 25 to 400 parts.

The preferred thickness of CGL is 0.01 to 10 $\mu$m, in particular 0.1 to 5 $\mu$m.

The CTL is formed by the same method as that of CGL; CTM is dissolved or dispersed alone or together with a binder resin and the dispersion is coated and dried on a substrate.

The preferred amount of CTM in CTL is 20 to 200 parts by weight per 100 parts binder resin, particularly 30 to 150 parts.

The preferred thickness of CTL is 5 to 50 $\mu$m, in particular 5 to 30 $\mu$m.

With regards to a protective layer which is incorporated according to a specific requirement, a binder used therein is a transparent resin having a volume resistance of not less than $10^8 \Omega.cm$, preferably not less than $10^{10}\Omega.cm$, in particular not less than $10^{13}\Omega.cm$. This binder may be a light-setting or thermosetting resin. The examples of such a light-setting or thermosetting resin are as follows: acrylic resin, silicon resin, epoxy resin, urethane resin, urea resin, phenol resin, polyester resin, alkyd resin and melamine resin, each being thermosetting type; light-setting cinnamic resin; and copolymeric or condensation resins comprising any of these resins; and any of light-setting and thermosetting resins applicable to an electrophotographic material. The protective layer may, if necessary, contain a thermoplastic resin by not more than 50 wt % in order to improve processability and physical properties (prevention of cracks and increased flexibility). The examples of such a thermoplastic resin include polypropylene, acrylic resin, methacrylic resin, vinyl chloride resin, vinyl acetate resin, epoxy resin, butyral resin, polycarbonate resin, silicon resin, or copolymeric resins of these resins, for example, vinyl chloride-vinyl acetate copolymeric resin, and vinyl chloride-vinyl acetate-maleic acid anhydride copolymeric resin; and polymeric organic semiconductor such as poly-N-vinylcarbazole; and any of thermoplastic resins applicable to an electrophotographic material.

The protective layer may contain an electron accepting material. This layer may additionally contain an ultrasonic absorbent or the like to protect the CGL. These ingredients are, together with the binder, dissolved in a solvent, and thereby the solution is coated and dried to form a layer of not thicker than 2 $\mu$m, or preferably not thicker than 1 $\mu$m, by means of dip coating, spray coating, blade coating or roll coating.

EXAMPLES

The present invention is hereunder described by referring to the preferred embodiments. However, it should be understood that the scope of mode of embodying the invention is not limited only to these examples.

First, on an electroconductive substrate comprising a polyester film having an aluminum foil lamination was formed a 0.1 μm thick intermediate layer of vinyl chloride-vinyl acetate-maleic anhydride copolymer (Eslec MF-10, Sekisui Chemical Co., Ltd.).

Second, 40 g of sublimated 4,10-dibromoanthoanthrone (II-73) as CGM was pulverized in a ceramic ball mill for 24 hours at 40 rpm, thereby 20 g Panlite L-1250 (Sekisui Chemical Co., Ltd.) and 1300 ml 1,2-dichloroethane were added. The resultant mixture was homogenized for another 24 hours to provide a coating solution for CGL. This solution was coated on the intermediate layer mentioned above so as to form a 1 μm thick CGL.

Next, a solution was prepared by dissolving 7.5 g CTM (III-61), 10 g Panlite L-1250 and 0.150 g compound (HP-117) in 80 ml 1,2-dichloroethane. The solution was coated on the CGL to form a 15 μm thick CTL. Thus, a photoreceptor Sample No. 1 of the invention was obtained.

Sample Nos. 2 through 4 as well as Nos. 19 and 20 were similarly prepared based on the method described in the preparation of Sample No. 1, except the modifications of combinations of CTM and additive in CTL, as specified in Table.

Additionally, on an electroconductive substrate comprising a 100 μm thick polyethylene terephthalate film vacuum-deposited with aluminum was formed an intermediate layer identical with that of Sample No. 1. Then, 1.5 g bisazo compound (II-68) serving as CGM was dispersed into 100 ml mixed solvent of 1,2-dichloroethane and monoethanolamine (a volume ratio of 1000:1) with a ball mill for 8 hours. The resultant dispersion was coated an thoroughly dried over the intermediate layer to form a 0.3 μm thick CGL. Next, a solution was prepared by dissolving 11.25 g styril compound (III-11) serving as CTM, 15 g Panlite L-1250 (previously mentioned) and 0.225 g compound (HP-35) into 100 ml 1,2-dichloroethane. The obtained solution was coated and thoroughly dried over the CGL to form a 15 μm thick CTL. Thus, photoreceptor Sample No. 5 of the invention was obtained.

Sample Nos. 6 and 19 were prepared similarly to Sample No. 5, except that compounds listed in Table were used as CTM and additive.

Sample No. 7 was prepared by the following procedure. First, 1.0 g τ-type non-metal phthalocyanine II-62 was added to a mixed solution comprising 2.0 g polyvinylbutylal (Eslex BL-S, Sekisui Chemical Co., Ltd.) and 98 ml 1,2-dichloroethane, and was dispersed by an ultrasonic disperser. To form CGL, the dispersion was coated on a electro conductive substrate comprising polyester film laminated with aluminum foil, and was dried so that the layer thickness was 0.3 μm. CTL was formed on CGL in a manner identical with that of Sample No. 1, except that CTM and a compound in CTL were changed as specified in Table.

Sample No. 8 was prepared similarly to Sample No. 7, except that the compound HP-79 in CTL was eliminated.

Sample Nos. 9 and 10 were prepared in a manner identical with that of Sample No. 1, except that CTM and a compound in CTL was changed as specified in Table.

Sample Nos. 11 through 16 as well as Sample Nos. 20 through 24 were prepared in a manner identical with that of Sample No. 5, except that CGM, CTM and an additive in CTL were changed as specified in Table.

EVALUATION METHOD

To measure a residual potential $V_R$, the prepared photoreceptors were independently loaded in a modified version of U-Bix Model 1550 MR (manufactured by Konica Corporation). Subsequently, the Model 360 surface potentiometer (manufactured by Trec) was installed to the position of a developing unit, and copying operation was repeated for 10,000 times in the normal A4 copying mode. In Table, $\Delta V_R$ represents the amount of variation after 10,000 sheet copying. The data in parentheses "( )" represent the $V_R$ value at the initial stage. $E_{100}^{600}$ was measured using the S350 Linear/Log Optimeter (manufactured by United Detector Technology) according to the following arrangement: a black sheet of O.D.=1.3 was placed on the original document and the surface potential of the photoreceptor was adjusted to $V_S=600$ V; and a white sheet was placed on the original document and the surface potential of the photoreceptor was adjusted to $V_s=100$ V; thereby the light intensity to meet the above-mentioned settings was measured using the optimeter mentioned above. The electrification potential $V_A$ was measured using U-Bix Model 1550 MR: the copying process was performed with an exposing lamp turned off, and the surface potential of the photoreceptor was measured at the developing position. $V_A$ in Table represents the difference of $V_A$ before and after 10,000 sheets copying. Data in the parentheses "( )" represent the $V_A$ values prior to 10,000 sheets copying.

TABLE

| Sample No. | CGM | CTM | Compound added | $E_{100}^{600}$(lX.S) Initial | After 10,000 sheet copying | $\Delta V_R$ | (V) | $\Delta V_A$ | (V) |
|---|---|---|---|---|---|---|---|---|---|
| 1 (Invention) | II-73 | III=61 | HP-117 | 3.6 | 3.8 | (15) | 20 | (680) | 20 |
| 2 (Comparative) | II-73 | III-61 | No addition | 3.6 | 4.6 | (15) | 60 | (670) | 70 |
| 3 (Invention) | II-73 | III=2 | HP-79 | 4.0 | 4.1 | (20) | 30 | (740) | 20 |
| 4 (Comparative) | II-73 | III-62 | No addition | 4.0 | 5.2 | (20) | 60 | (720) | 80 |
| 5 (Invention) | II-68 | III=11 | HP-35 | 2.7 | 3.0 | (10) | 30 | (660) | 45 |
| 6 (Comparative) | II-68 | III-11 | No addition | 2.7 | 3.5 | (5) | 60 | (650) | 90 |
| 7 (Invention) | II-62 | III=9 | HP-79 | 4.0 | 4.3 | (20) | 10 | (850) | 40 |
| 8 (Comparative) | II-62 | III-9 | No addition | 4.0 | 4.6 | (15) | 40 | (850) | 110 |
| 9 (Invention) | II-73 | III=24 | HP-70 | 2.8 | 3.0 | (10) | 15 | (900) | 5 |
| 10 (Comparative) | II-73 | III-24 | No addition | 2.8 | 3.2 | (15) | 30 | (860) | 120 |
| 11 (Invention) | II-71 | III=31 | HP-18 | 4.0 | 4.2 | (40) | 10 | (830) | 15 |
| 12 (Comparative) | II-71 | III-31 | No addition | 4.0 | 4.6 | (40) | 30 | (830) | 80 |
| 13 (Invention) | II-70 | III=77 | HP-11 | 4.5 | 4.6 | (15) | 5 | (630) | 10 |
| 14 (Comparative) | II-70 | III-77 | No addition | 4.5 | 5.0 | (10) | 40 | (620) | 50 |
| 15 (Invention) | II-71 | III=1 | HP-117 | 3.4 | 3.5 | (15) | 15 | (710) | 20 |
| 16 (Comparative) | II-71 | III-1 | No addition | 3.4 | 4.0 | (20) | 50 | (700) | 80 |

TABLE -continued

| Sample No. | CGM | CTM | HP/HA compounds | $E_{100}^{600}$ (lX.S) Initial | $E_{100}^{600}$ (lX.S) After 10,000 sheet copying | $\Delta V_R$ (V) | $\Delta V_A$ (−V) |
|---|---|---|---|---|---|---|---|
| 17 (Invention) | II-73 | III=61 | HP-7 | 4.0 | | 10 | (820) |
| | | | HA-3 | | 4.1 | (12) | 20 |
| 18 (Invention) | II-73 | IV=14 | HP-7 | 4.5 | | 20 | (860) |
| | | | HA-3 | | 4.8 | (13) | 40 |
| 19 (Invention) | II-68 | III=2 | HP-7 | 3.5 | | 5 | (880) |
| | | | HA-3 | | 3.5 | (10) | 5 |
| 20 (Invention) | II-62 | III=61 | HP-12 | 2.5 | | 30 | (650) |
| | | | HA-1 | | 2.8 | (20) | 20 |
| 21 (Invention) | II-3 | IV=25 | HP-12 | 4.0 | | 50 | (770) |
| | | | HA-1 | | 4.5 | (30) | 5 |
| 22 (Invention) | II-71 | VIII=3 | HP-12 | 3.5 | | 5 | (740) |
| | | | HA-1 | | 3.6 | (5) | 50 |
| 23 (Invention) | II-70 | VII=1 | HP-12 | 3.9 | | 10 | (660) |
| | | | HA-1 | | 4.0 | (15) | 45 |
| 24 (Invention) | II-35 | IX=1 | HP-12 | 4.0 | | 10 | (820) |
| | | | HA-1 | | 4.1 | (25) | 30 |

According to the above results, the photoreceptor of the invention exhibits favorable electrification properties even after repeated use, wherein the increase of residual potential is remarkably reduced, and the loss of electrification potential due to repeated use is reduced.

What is claimed is:

1. An electrophotographic photoreceptor comprising an elecroconductive substrate, a photo-sensitive layer containing a compound represented by general formula [A];

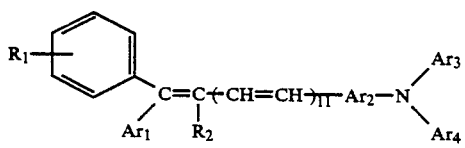

wherein,
$R_1$ represents a hydrogen atom or a substituent; $R_2$ represents a hydrogen atom, a substituted or unsubstituted alkyl group, or a substituted or unsubstituted aryl group; $Ar_1$ represents a hydrogen atom, a substituted or unsubstituted phenyl group, a substituted or unsubstituted naphthyl group; $Ar_2$ represents a substituted or unsubstituted phenylene group or a substituted or unsubstituted naphthylene group; $Ar_3$ and $Ar_4$ independently represent a substituted or unsubstituted alkyl group, a substituted or unsubstituted phenyl group or a substituted or unsubstituted naphthyl group; and n represents an integer of 0 or 1; and
a compound containing in its chemical structure a hindered phenolic structure unit.

2. The photoreceptor of claim 1, wherein said hindered phenolic structure unit comprises a phenol group of which a hydrogen atom in the phenolic hydroxyl group or in the ortho position with respect to the phenolic hydroxyl group has been substituted by a bulky atomic group.

3. The photoreceptor of claim 1, said hindered phenolic structure unit is represented by general formula [I];

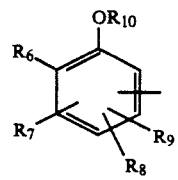

wherein, $R_6$ is a branched alkyl group, $R_7$, $R_8$ and $R_9$ independently represent a hydrogen atom, a hydroxyl group, an alkyl group, an aryl group or a divalent group, provided that at least two of $R_7$, $R_8$ and $R_9$ may be combined with each other to form a ring when they are divalent groups, $R_{10}$ represents a hydrogen atom, an alkyl group or an alkylidene group.

4. The photoreceptor of claim 3, wherein $R_6$ is a tertiary or secondary alkyl group having 3 to 40 carbon atoms; $R_7$, $R_8$ and $R_9$ are independently selected from an alkyl group having 1 to 40 carbon atoms, a phenyl group, a naphthyl group, a pyridinyl group; and $R_{10}$ is an alkyl or an alkylidene group having 1 to 40 carbon atoms.

5. The photoreceptor of claim 3, wherein the ring is a chroman ring.

6. The photoreceptor of claim 1, wherein said compound containing the hindered phenolic structure unit is contained in the photo-sensitive layer.

7. The photoreceptor of claim 6, wherein said photosensitive layer has a single layer structure and contains a charge generation material.

8. The photoreceptor of claim 6, wherein said photosensitive has a multi-layer structure comprising a layer containing a charge generation material and a layer containing the compound represented by formula [I].

9. The photoreceptor of claim 8, wherein the layer containing the charge generation material further contains the compound represented by formula [I].

10. The photoreceptor of claim 1, wherein said photoreceptor further comprises a non-photo-sensitive layer and the compound containing a hindered phenolic structure unit is contained in said non-photo-sensitive layer.

11. The photoreceptor of claim 10, wherein said non-photo-sensitive layer is provided between the electroconductive substrate and the photo-sensitive layer or on the photo-sensitive layer on the opposite side relative to the electroconductive support.

12. The photoreceptor of claim 6, wherein said photoreceptor further comprises a non-photo-sensitive layer and the compound containing a hindered phenolic structure unit is contained in said non-photo-sensitive layer.

13. The photoreceptor of claim 1, wherein said photoreceptor further comprises a compound containing in its chemical structure a hindered amine structure unit.

14. The photoreceptor of claim 13, wherein said compound containing a hindered amine structure unit is contained in the photo-sensitive layer.

15. The photoreceptor of claim 13, wherein said hindered amine structure unit is represented by general formula [Ia];

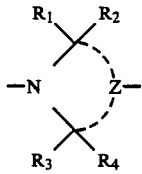

wherein $R_1$, $R_2$, $R_3$ and $R_4$ independently represent a hydrogen atom, an alkyl group or an aryl group, Z is a group of atoms necessary to complete a nitrogen-containing aliphatic ring, provided that either one of $R_1$ or $R_2$, or $R_3$ or $R_4$ may be incorporated in Z to form a double bond.

16. The photoreceptor of claim 1, wherein said photoreceptor is used for negative electrification.

17. A method of forming a negatively charged electrostatic latent image comprising a step of electrifying the surface of a photoreceptor in the negative electric potential, said photoreceptor comprising an elecroconductive substrate, a photo-sensitive layer containing a compound represented by general formula [A];

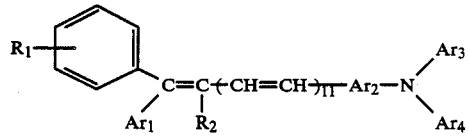

wherein, $R_1$ represents a hydrogen atom or a substituent;

$R_2$ represents a hydrogen atom, a substituted or unsubstituted alkyl group, or a substituted or unsubstituted aryl group;

$Ar_1$ represents a hydrogen atom, a substituted or unsubstituted phenyl group, a substituted or unsubstituted naphthyl group;

$Ar_2$ represents a substituted or unsubstituted phenylene group or a substituted or unsubstituted phenylene group or a substituted or unsubstituted naphthylene group;

$Ar_3$ and $Ar_4$ independently represent a substituted or unsubstituted alkyl group, a substituted or unsubstituted phenyl group or a substituted or unsubstituted naphthyl group; and n represents an integer of 0 or 1; and a compound containing in its chemical structure a hindered phenolic structure unit.

* * * * *